(12) United States Patent
Tamagni

(10) Patent No.: US 11,897,418 B2
(45) Date of Patent: Feb. 13, 2024

(54) SYSTEM AND METHOD FOR DETERRENCE OF CATALYTIC CONVERTER THEFT

(71) Applicant: Richard Blake Tamagni, Roseville, CA (US)

(72) Inventor: Richard Blake Tamagni, Roseville, CA (US)

(73) Assignee: CCM IP LLC, Roseville, CA (US)

( * ) Notice: Subject to any disclaimer, the term of this patent is extended or adjusted under 35 U.S.C. 154(b) by 327 days.

(21) Appl. No.: 17/174,261

(22) Filed: Feb. 11, 2021

(65) Prior Publication Data

US 2021/0253062 A1     Aug. 19, 2021

Related U.S. Application Data

(60) Provisional application No. 63/113,051, filed on Nov. 12, 2020, provisional application No. 62/972,978, filed on Feb. 11, 2020.

(51) Int. Cl.
  *B60R 25/00*     (2013.01)
  *B60K 13/04*     (2006.01)

(52) U.S. Cl.
  CPC .................................... *B60R 25/00* (2013.01)

(58) Field of Classification Search
  CPC .................. B60R 25/00; B60R 25/006; B60R 2011/0094; B60R 2011/0096; B60K 13/04
  See application file for complete search history.

(56) References Cited

U.S. PATENT DOCUMENTS

| | | | |
|---|---|---|---|
| 2,160,808 A | 6/1939 | Bradley | |
| 2,308,969 A | 1/1943 | Riesing | |
| 3,199,815 A | 8/1965 | Martinkovic et al. | |
| 3,204,901 A | 9/1965 | Dunn | |
| 3,358,787 A | 12/1967 | Bangasser et al. | |

(Continued)

FOREIGN PATENT DOCUMENTS

| | | |
|---|---|---|
| AU | 2006200286 | 10/2006 |
| CA | 2390202 | 5/2001 |

(Continued)

OTHER PUBLICATIONS

Nika Megino "Catalytic Converters: Why Thieves Steal Them" Patch website https://patch.com/california/newark/catalytic-converters-why-theives-steal-them Jun. 7, 2012.

(Continued)

*Primary Examiner* — Barry Gooden, Jr.
(74) *Attorney, Agent, or Firm* — Clayton Howarth, P.C.

(57) ABSTRACT

A system and method for deterring catalytic converter theft are described. A variety of devices are described which can be installed as needed on the underside of a vehicle as part of a system to prevent easy access to the points where a catalytic converter is connected to the vehicle, thus deterring theft, or to prevent a catalytic converter from being removed from the vehicle after being disconnected from the exhaust system. The method comprises installing said devices to prevent this access. The devices may be installed separately or combined to protect multiple catalytic converters as needed and as dictated by the particular design of the exhaust system of a particular vehicle.

20 Claims, 14 Drawing Sheets

(56) References Cited

U.S. PATENT DOCUMENTS

| | | |
|---|---|---|
| 3,942,599 A | 3/1976 | Shimada |
| 3,944,177 A | 3/1976 | Yoda |
| 3,963,087 A | 6/1976 | Grosseau |
| 3,976,087 A | 8/1976 | Bolton et al. |
| 4,020,915 A | 5/1977 | Darnell et al. |
| 4,114,715 A | 9/1978 | Theron |
| 4,159,043 A * | 6/1979 | James ............... B60K 5/04 248/634 |
| 4,215,093 A | 7/1980 | Yasuda |
| D257,353 S | 10/1980 | Fogolin |
| 4,265,332 A | 5/1981 | Presnall et al. |
| D265,308 S | 7/1982 | Zimmer, Jr. |
| 4,351,535 A | 9/1982 | Mead |
| D277,843 S | 3/1985 | Gilbreath |
| 4,592,317 A | 6/1986 | Wrobel |
| 4,615,500 A | 10/1986 | Layson |
| 4,683,735 A | 8/1987 | Magrobi |
| 4,690,240 A | 9/1987 | Russo |
| 4,990,890 A | 2/1991 | Newby |
| 5,052,204 A | 10/1991 | Millar |
| 5,073,353 A | 12/1991 | Florian |
| 5,108,716 A | 4/1992 | Nishizawa |
| 5,168,957 A | 12/1992 | Ross |
| 5,249,442 A | 10/1993 | Wright |
| 5,307,048 A | 4/1994 | Sonders |
| D371,228 S | 6/1996 | Monin |
| 5,576,691 A | 11/1996 | Coakley et al. |
| 5,598,144 A | 1/1997 | Lace |
| 5,612,878 A | 3/1997 | Joao et al. |
| 5,636,799 A | 6/1997 | Trusty et al. |
| 5,660,334 A | 8/1997 | Trusty et al. |
| 5,839,081 A | 11/1998 | Joao et al. |
| 5,912,615 A | 6/1999 | Kretzmar et al. |
| 5,917,406 A | 6/1999 | Postel |
| 6,060,981 A | 5/2000 | Landes |
| D452,694 S | 1/2002 | Irie |
| 6,358,109 B1 | 3/2002 | Neisen |
| 6,629,050 B2 | 9/2003 | Modgil |
| D483,651 S | 12/2003 | Sander |
| D488,756 S | 4/2004 | Gough |
| D488,757 S | 4/2004 | Gough |
| 6,739,311 B1 | 5/2004 | Kingsley |
| D490,691 S | 6/2004 | Buss et al. |
| 6,893,053 B2 | 5/2005 | Thomas et al. |
| 6,921,112 B2 | 7/2005 | Atansoski et al. |
| 6,973,811 B2 | 12/2005 | Jenkyns |
| D528,951 S | 9/2006 | Oben |
| D530,187 S | 10/2006 | Esbaugh |
| D534,904 S | 1/2007 | Crawford |
| D556,545 S | 12/2007 | Titas et al. |
| D564,864 S | 3/2008 | Johnson et al. |
| D565,113 S | 3/2008 | Fischer, III |
| D566,518 S | 4/2008 | Friedman |
| 7,394,352 B2 | 7/2008 | Bell et al. |
| D579,754 S | 11/2008 | Gleason |
| 7,477,136 B2 | 1/2009 | Konno et al. |
| 7,506,667 B1 | 3/2009 | Johnson et al. |
| D593,087 S | 5/2009 | Andre et al. |
| D597,086 S | 7/2009 | Sergi et al. |
| 7,717,205 B2 | 5/2010 | Kertz et al. |
| 7,726,617 B2 | 6/2010 | Zambelli et al. |
| D625,334 S | 10/2010 | Gouge |
| 7,874,393 B2 | 1/2011 | Ahmed et al. |
| 7,919,052 B2 | 4/2011 | Ahmed |
| 7,971,676 B2 | 7/2011 | Dusa, II |
| 8,002,232 B2 | 8/2011 | Meislahn |
| D652,411 S | 1/2012 | Crawford et al. |
| D654,064 S | 2/2012 | Sergi |
| 8,281,575 B2 | 10/2012 | Merchant et al. |
| D671,390 S | 11/2012 | Ibarra |
| D684,147 S | 6/2013 | Stifal |
| 8,453,784 B2 | 6/2013 | Dusa, II |
| 8,491,845 B2 | 7/2013 | Ettireddy et al. |
| 8,544,802 B2 | 10/2013 | Bigham |
| D692,838 S | 11/2013 | Winn |
| D700,631 S | 3/2014 | Novacek et al. |
| 8,963,699 B2 † | 2/2015 | Potter |
| 9,030,310 B2 | 5/2015 | Van Wiemeersch et al. |
| 9,068,582 B2 | 6/2015 | Wolbert et al. |
| D736,066 S | 8/2015 | Hull |
| 9,145,110 B2 | 9/2015 | Van Wiemeersch et al. |
| 9,227,594 B2 | 1/2016 | Reed et al. |
| 9,248,806 B2 | 2/2016 | Wu et al. |
| D759,465 S | 6/2016 | Reed |
| 9,493,085 B2 | 11/2016 | Van Wiemeersch et al. |
| D776,095 S | 1/2017 | Brown |
| D781,508 S | 3/2017 | Huh |
| D782,741 S | 3/2017 | Battaglieri |
| 9,631,541 B2 | 4/2017 | Van Wiemeersch et al. |
| 9,657,622 B2 | 5/2017 | Crawford et al. |
| D793,184 S | 8/2017 | Lammel |
| D809,908 S | 2/2018 | Sung |
| 10,071,626 B2 | 9/2018 | Kuhn et al. |
| 10,328,896 B2 | 6/2019 | Salter et al. |
| D861,464 S | 10/2019 | Eveland et al. |
| D879,008 S * | 3/2020 | Pringle ..................... D12/223 |
| D885,338 S | 5/2020 | Chen |
| D889,341 S | 7/2020 | Druffel |
| D896,027 S | 9/2020 | Wu |
| D896,568 S | 9/2020 | Smith |
| D898,221 S | 10/2020 | Chou et al. |
| D906,791 S | 1/2021 | Harders |
| D917,373 S | 4/2021 | Tamagni |
| D917,374 S | 4/2021 | Tamagni |
| 2005/0218270 A1 | 10/2005 | Doverspike |
| 2008/0302089 A1 | 12/2008 | Way et al. |
| 2010/0083644 A1 | 4/2010 | Biedler et al. |
| 2010/0258703 A1 | 10/2010 | Meislahn |
| 2011/0036130 A1 | 2/2011 | Hisler |
| 2011/0158863 A1 | 6/2011 | Tomosue et al. |
| 2011/0253471 A1* | 10/2011 | Dusa, II .................. F01N 13/18 180/287 |
| 2012/0046807 A1 | 2/2012 | Ruther et al. |
| 2013/0300550 A1 | 11/2013 | Potter |
| 2014/0104048 A1 | 4/2014 | De Kock et al. |
| 2016/0318388 A1* | 11/2016 | Kuhn ..................... F01N 3/103 |
| 2017/0159880 A1 | 6/2017 | Stechmann |
| 2018/0194218 A1* | 7/2018 | Motoyama ............ B01D 53/94 |
| 2018/0306092 A1* | 10/2018 | Lecoester ........... F01N 13/1805 |
| 2018/0340455 A1* | 11/2018 | Hidaka .................. F01N 3/101 |
| 2020/0086569 A1 | 3/2020 | MacNiel et al. |
| 2020/0298914 A1* | 9/2020 | Sakashita ............... B60K 13/04 |
| 2022/0403769 A1* | 12/2022 | Todd .................... F01N 13/1855 |
| 2023/0061602 A1* | 3/2023 | Nommensen .......... B62D 21/10 |

FOREIGN PATENT DOCUMENTS

| | | |
|---|---|---|
| CA | 2495061 | 2/2004 |
| CA | 2641173 | 9/2007 |
| CA | 2596036 | 4/2008 |
| CN | 1067008 | 12/1992 |
| CN | 3295858 | 5/2003 |
| CN | 302534863 | 8/2013 |
| CN | 203318352 | 12/2013 |
| CN | 103895607 | 7/2014 |
| CN | 103895608 | 7/2014 |
| CN | 201830053960 | 2/2019 |
| CN | 201830638478 | 4/2019 |
| CN | 201930026389 | 8/2019 |
| DE | 20214763 | 7/2003 |
| DE | 102004047809 | 1/2006 |
| DE | 102007011813 | 9/2008 |
| EP | 0335166 | 4/1989 |
| EP | 0903271 | 3/1999 |
| EP | 000021332-0005 | 8/2003 |
| EP | 2154036 | 2/2010 |
| EP | 2631446 | 8/2013 |
| GB | 2466483 | 6/2010 |
| JP | 2585888 | 11/1998 |
| JP | 2002037028 | 2/2002 |
| JP | 2002059812 | 2/2002 |
| JP | 3559235 | 8/2004 |
| JP | 200516374 | 1/2005 |
| JP | 2006076546 | 3/2006 |

(56) References Cited

FOREIGN PATENT DOCUMENTS

| | | |
|---|---|---|
| JP | 2006199168 | 8/2006 |
| JP | 3836350 | 10/2006 |
| JP | 200985171 | 4/2009 |
| JP | 4820847 | 11/2011 |
| JP | 5351476 | 11/2013 |
| JP | 6351110 | 7/2018 |
| KR | 19990015652 | 5/1999 |
| KR | 3020040014642 | 3/2005 |
| KR | 100553257 | 2/2006 |
| KR | 100971278 | 7/2010 |
| KR | 101310014 | 9/2013 |
| KR | 101663096 | 10/2016 |
| WO | WO8807462 | 10/1988 |
| WO | WO9418038 | 8/1994 |
| WO | WO9701462 | 1/1997 |
| WO | WO9701463 | 1/1997 |
| WO | WO02077424 | 10/2002 |
| WO | WO2011076839 | 6/2011 |
| WO | WO2012164274 | 12/2012 |
| WO | WO2013070793 | 5/2013 |
| WO | WO2013124409 | 8/2013 |
| WO | WO2013156040 | 10/2013 |
| WO | DM082451 | 2/2014 |
| WO | WO2014128911 | 8/2014 |
| WO | WO2019121155 | 6/2019 |
| WO | WO2021163383 | 8/2021 |

OTHER PUBLICATIONS

Josh Max "Catalytic Converter Thefts Plague Car Owners—Here's How to Slow Down Thieves" Forbes website https://www.forbes.com/sites/joshmax/2019/04/02/catalytic-converter-thefts-continue-to-plague-car-owners-at-every-income-level/#2ed45197564f Apr. 2, 2019.

Edmunds "In Under Two Minutes: Catalytic Converter Theft" Edmunds website https://www.edmunds.com/auto-insurance/in-under-two-minutes-catalytic-converter-theft.html Apr. 30, 2009.

Elk Grove Police Department "Catalytic Converter Theft & Prevention" website http://www.elkgrovepd.org/community/community_programs/catalytic_converter_theft prevention as early as Sep. 23, 2020.

Pretorius "Catalytic Converter Thefts—Prevention Tips" Volante Garage Edmonton website https://www.garageservicesnorthlondon.co.uk/catalytic-converter-thefts-prevention-tips/ Apr. 5, 2019.

Toyota "Catalytic Converter Theft: How to protect your car" website https://blog.toyota.co.uk/catalytic-converter-theft-how-to-protect-your-car Apr. 7, 2019.

Bibles "The Best Car Anti-Theft Devices "Review" in 2020" website https://www.carbibles.com/best-car-anti-theft-devices/ Last updated Jan. 17, 2020.

David Beaudrie "How to Prevent Catalytic Converter Theft" The Spruce website https://www.thespruce.com/preventing-catalytic-converter-theft-1835268 Jan. 9, 2019.

John Redfern "How to Prevent Catalytic Converter Theft from Cars" Motoring Research website https://www.motoringresearch.com/advice/stop-catalytic-converter-theft/ Sep. 3, 2020.

City of Garden Grove "Preventing Catalytic Converter Theft" website https://ggcity.org/docs/police-press-release/preventing-catalytic-converter-theft as early as Sep. 23, 2020.

Emily Delbridge "What to do if your catalytic converter was stolen" The Balance website https://www.thebalance.com/my-catalytic-converter-was-stolen-527197 Apr. 27, 2020.

West Yorkshire Police "Catalytic Converter Theft Prevention Advice" website https://www.westyorkshire.police.uk/advice/vehicle-crime/vehicle-crime/catalytic-converter-theft-prevention-advice as early as Sep. 23, 2020.

Reddit "2014 Honda CR-V dragging a metal plate" posted by u/Choodtu 4 years ago (2016) https://bit.ly/3l3HdSp.

CivicX.com "Underbody plate and clip help" posted Aug. 6, 2018 by DetEv https://bit.ly/3nafDVe.

Amazon.com "Design Engineering 010879 Polaris RZR 2008-14 Cargo Heat Shield" available as early as Feb. 13, 2018 https://amzn.to/34oIRYb.

Auto Defender USA "Cat Defender Gen III (Except Prius C)" potentially as early as Mar. 5, 2020 https://bit.ly/2Sp5Dtk.

Shpock "Toyota Prius Catalytic Converter Cover" website https://bit.ly/3iyaDq5 listed on Jan. 15, 2020.

Millercat 2004-2009 Prius Gen 2 Cat Shield potentially as early as Mar. 2, 2020 https://www.millercat.com/catshield/gen2.

KASPA "Cat Protection" as early as Oct. 13, 2020 http://kaspa.uk/cat-protection.

Youtube.com "2010-2015 Gen 3 Prius Cat Shield Installation Video" Mar. 11, 2020 https://www.youtube.com/watch?v=Ds_GAqciYIA.

FOX13 "UPD, Jiffy Lube partner to crack down on catalytic converter thefts" Oct. 20, 2022 https://www.fox13now.com/news/local-news/upd-jiffy-lube-partner-to-crack-down-on-catalytic-converter-thefts.

Peter Neilson, 'Stop Catalytic Converter Theft on Toyota Prius With This New Protective Shield' Torque News, Oct. 31, 2019; www.torquenews.com/8113/stop-catalytic-converter-theft-toyota-prius-new-protective-sheild (sic); accessed Sep. 14, 2022.†

'Catalytic Converter Security'; Tacoma World discussion forums; Discussion in '2nd Gen. Tacomas (2005-2015)' started by Fredfifty, Jul. 27, 2015; post #17 by 'edge it', dated Jul. 29, 2015; www.tacomaworld.com/threads/catalytic-converter-security.384228/; accessed Sep. 13, 2022.†

'Toyota Sequoia Catalytic Converter Theft Deterrent Skid Plate'; OR-FAB website , Performance Auto Group, Inc. https://web.archive.org/web/20111017165652/http://orfab.com/...A%20CATALYTIC%20CONVERTER%20THEFT%20DETERRENT%20SKID%20PLATE ; archived Oct. 17, 2011; accessed Sep. 19, 2022.†

'Catalytic converter skid plates & theft deterrent' Tundras.com discussion forum: Discussion in '2.5 Gen Tundras (2014-2021)' started by Cat3ILS, Jan. 7, 2017; post Nos. 75, 80 and 87 dated Jul. 10, 2017 and Sep. 15, 2017; https://www.tundras.com/threads/catalytic-converter-skid-plates-theft-deterrent.9688/page-3; Accessed Sep. 19, 2022.†

'How do you prevent your catalytic converter from being stolen?' Quora answer by user Chris Coleman; https://www.quora.com/How-do-you-prevent-your-catalytic-converter-from-being-stolen/answer/Chris-Coleman-37/log; Dated Feb. 11, 2019; Accessed Sep. 20, 2022.†

'Catalytic Converter Theft Prevention Cages . . . Will It Work ??? '; Tacoma World Discussion in 'Technical Chat' started by plee33, Nov. 13, 2012, dated Nov. 13, 2012; https://www.tacomaworld.com/threads/catalytic-converter-theft-prevention-cages-will-it-work.248520/; accessed Sep. 20, 2022.†

'Toyota skid plates anti catalytic converter theft deterrent 10 gauge steel Direct bolt-on'; Facebook user Desert Eagle post dated Jan. 2, 2018; https://www.facebook.com/DesertEagleOffroad/posts/toyota-skid-plates-anti-catalytic-converter-theft-deterrent-10-gauge-steel-direc/571907999824655/#; Accessed Sep. 20, 2022.†

'Catalytic Converter Antitheft Device?' Imgur image; https://imgur.com/Z6YDxZl; dated Jan. 27, 2016, Accessed Sep. 20, 2022†

\* cited by examiner
† cited by third party

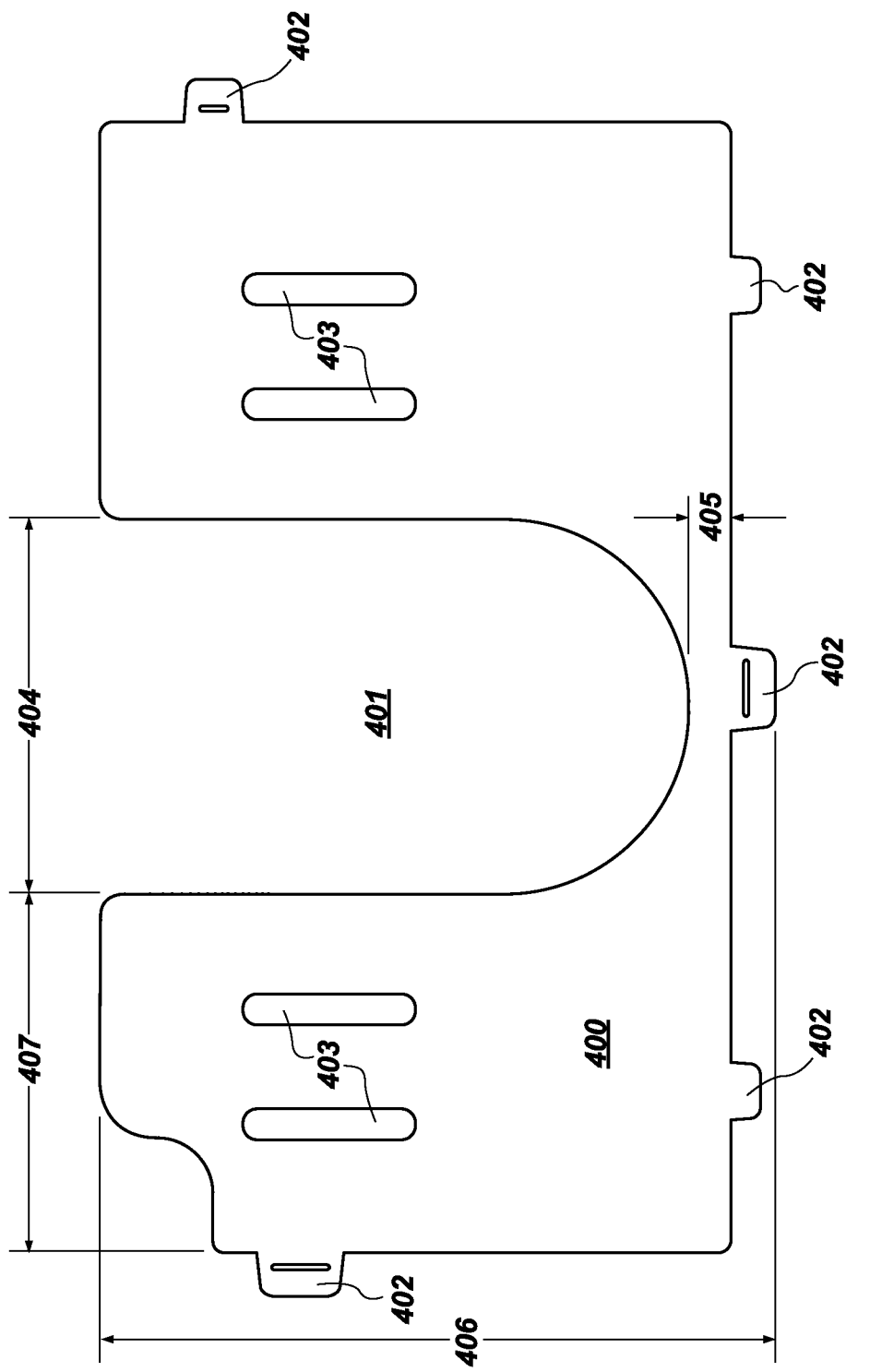

SYSTEM AND METHOD FOR DETERRENCE OF CATALYTIC CONVERTER THEFT

CROSS-REFERENCE TO RELATED APPLICATIONS

This application claims the benefit of U.S. provisional patent application No. 62/972,978 filed Feb. 11, 2020 and U.S. provisional patent application No. 63/113,051 filed Nov. 12, 2020.

STATEMENT REGARDING FEDERALLY SPONSORED RESEARCH AND DEVELOPMENT

Not Applicable.

BACKGROUND

This disclosure relates generally to the field of devices designed for vehicles. It is more specifically related to devices designed to deter the theft of catalytic converters from vehicles.

Catalytic converters contain several precious metals, including platinum, palladium, and rhodium. The existence of these precious metals, in sufficient quantity makes catalytic converters an attractive target for theft by criminals. Vehicles which tout a "zero-emissions" status, such as hybrid vehicles, typically possess the highest content of precious metals, and are an especially valuable target for crime. For example, a brand-new catalytic converter replacement for the Toyota® Prius,® can cost more than $2000 USD. In general, a catalytic converter can generate a significant payment from a scrap dealer. An efficient team of two thieves, with the correct tools, can remove a converter in less than two minutes. In one night, such a team could make several thousand dollars during a few hours of illicit activity.

The problem of catalytic converter theft is a massive one. In Northern California alone, crime statistics put the number of thefts into the many thousands per month, and in some months, topping ten thousand per month. Given that converter theft is such a lucrative illicit enterprise, these numbers are unlikely to drop. As such, it is up to the individual vehicle owner to find a way to protect his vehicle from this type of crime.

As catalytic converter theft is common, a number of solutions have been proposed. Some solutions propose that a vehicle owner weld the catalytic converter to the frame of the vehicle. Other disadvantageous approaches have emerged which serve to act as a deterrence. One approach is set forth in U.S. Pat. No. 7,971,676 which includes a cable cage design that surrounds the catalytic converter with aircraft grade wire rope. While potentially effective, it is very complicated and very difficult to install. Other approaches include the Cat Strap device (www.catstrap.net as of Feb. 11, 2021), which is comprised of a strap that is attached across the catalytic converter and an adjacent exhaust pipe. The strap has a multi-cable construction which is difficult to cut through, and is connected to a high decibel auditory alarm which is set off when the cables are breached.

Another requirement for any device to prevent catalytic converter theft is that it allow for a visual inspection of the catalytic converter, as a number of jurisdictions require that the device be periodically visually inspected. Easy visual access to the information on the catalytic converter is essential to the ease of use of any solution to deter catalytic converter theft. Furthermore, not hindering airflow can be important as well.

The earlier solutions described herein fall short in their complexity of design, failing to deny the thief access to the catalytic converter or some other failure. A need therefore exists for a catalytic converter theft deterrence device which achieves simplicity of design while denying a thief access to the converter as much as possible.

In addition, different vehicles have different construction and different solutions are required. The Toyota Prius varies in its model years in the collection of components around the catalytic converter, with different model years and models having different components immediately around the catalytic converter, requiring differently-shaped covers. Other vehicles, for example, a Nissan® NV-200 cargo van, produced by Nissan North America Inc., (see https://www.nissanusa.com/vehicles/commercial/nv200-compact-cargo.html as of Feb. 11, 2021, which is incorporated herein in its entirety by this reference) which is often used as a fleet vehicle, has two catalytic converters which are easily accessible from multiple points. What is required is a solution that is effective to deter catalytic converter theft in a variety of vehicles.

SUMMARY OF THE DISCLOSURE

The present disclosure comprises a novel system and method of protecting the catalytic converter of a vehicle, and in several specific illustrative embodiments, the catalytic converters of various generations of Toyota Prius and of a Nissan NV-200 but it will be understood that the principles taught herein can readily be applied to any number of different vehicles and different catalytic converters.

BRIEF DESCRIPTION OF THE DRAWINGS

Some embodiments of the present disclosure are illustrated as examples and the scope of the present disclosure is not limited by the figures in the accompanying drawings, in which like references may indicate similar elements and in which:

FIG. 4 shows the third component of one embodiment of the present disclosure, being the front shield of the box secured around the catalytic converter and attached to the underside of the vehicle.

Figure 1A:
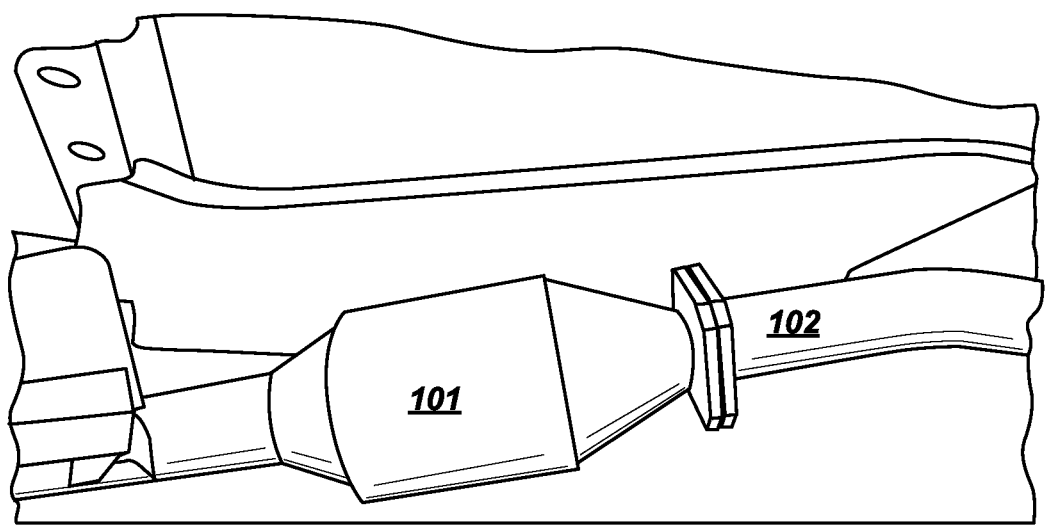
FIG. 1A shows a catalytic converter on the underside of vehicle in a configuration that is exposed and easy to access for a thief.

The inclusion of any dimensions in the accompanying drawings or in the present specification is merely illustrative or exemplary and cannot be limiting of the present disclosure.

DETAILED DESCRIPTION

For the purposes of promoting an understanding of the principles in accordance with this disclosure, reference will now be made to the illustrative embodiments of the present disclosure illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the devices, systems, processes and methods will be disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular illustrative embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a", "an", and "the" include plural referents unless the context clearly dictates otherwise.

As used herein, the terms "comprising," "including," "containing," "characterized by," "having" and grammatical equivalents thereof are inclusive or open-ended terms that do not exclude additional, unrecited elements or method steps.

For convenience in describing the method and use of the current disclosure, singular masculine or feminine pronouns have been used to describe the person executing the methods described. It is to be understood that no limitation of the invention to use by one gender or the other is intended by such use.

In describing the illustrative embodiments of this disclosure, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps or applications in an unnecessary fashion. Nevertheless, the specification and claims should be read with the understanding that such combinations are entirely within the scope of the claims.

As used herein, "security fasteners" means any of a number of devices which are used as fasteners which include special security precautions making it difficult to remove them without a specific security tool. This may include both screws and bolts, or other types of fasteners that require some type of security tool to remove. For example, a screw may have a an oddly shaped drive, or require a special tool to fasten, while a security nut or bolt may have a smooth head which can only be gripped by a specific tool. A variety of types of security fasteners are known in the art, and additional types of security fasteners may be possible. As examples, devices described as "security screws," "tamper-proof screws," screws having a "one-way slot drive," or devices requiring a "snake eyes spanner drive" to remove or tighten may be included as "security fasteners"; however, the term is not meant to be limiting. While specific embodiments of the instant disclosure may call for a particular type of security fastener, this is not intended to limit the type of security fastener which may be used, and indeed said security fastener may be substituted for a different type of security fastener which fits the situation. As such, the term "security fastener" is used to describe any of the variety of fasteners possible which are designed to prevent easy removal without a security tool. When a more specific term is used, it is to be understood that the substitution of another type of security fastener is intended to be within the instant disclosure. "Security Fasteners" may also include devices described as tamper-proof hardware, tamper proof screws, and other tamper proof fasteners.

A novel device, system, and method of deterring catalytic converter theft is described. It will be appreciated that the main goal of the system is to make theft of the catalytic converter(s) of a vehicle difficult enough that a potential thief moves on to another target, while appreciating that no system can prevent theft in all cases. Furthermore it will be appreciated that due to differing designs, cosmetic changes may be required to the appearance of the device and the locations of specific anchoring bolts and devices. Several individual embodiments are described, including embodiments which protect the catalytic converters on various generations of the Toyota® Prius,® as well as a specific illustrative embodiment of the system and method of protecting the catalytic converters of a Nissan® NV-200 is described. However, it will be appreciated that many of the principles and disclosures herein may apply to many other vehicles.

The instant disclosure illustrate vehicle-specific devices to deter catalytic converter theft which provides benefits not previously available. Each device described herein is adapted for a particular vehicle, based on the principles set forth in this disclosure. It will be appreciated that the specific embodiment created for one vehicle will not be installable on a different vehicle. Specific embodiments disclosed in this application include an embodiment designed to fit on a Toyota® Prius®, model year 2004-2009, shown at least in FIG. 11, an embodiment designed to fit on a Toyota® Prius®, model year 2010-2015, shown at least in FIG. 14, and an embodiment designed to fit on a Nissan® NV-200 Cargo van, shown at least in FIG. 10. While elements of these embodiments may be incorporated into embodiments which will apply to other specific vehicles, the specific elements will generally not be directly transferable to different vehicles.

The specialization of the device as a vehicle specific device allows for better protection, as a different vehicles may require protection in different areas, or different types of protection in order to deter catalytic converter theft. For example, in the case of a Toyota® Prius®, a plate cut to fit the specific configuration of the lower portion of the vehicle will generally suffice to deter catalytic converter theft while, though in some vehicles additional rails or plates may be added to provide additional deterrence. However, unlike a Toyota® Prius®, a Nissan® NV-200 has two catalytic converters, neither of which is easily covered by a plate as the Toyota® Prius®, and as such a different arrangement of the system is required to provide adequate theft deterrence.

A number of devices offer generic protection for a catalytic converter; however, these devices cannot be incorporated as specifically into the vehicle, and may not provide the same level of theft deterrence with the minimal interference with the vehicle itself. Some embodiments of the instant invention may be installed with the vehicle specific hardware already present on a given vehicle, which is difficult or impossible to accomplish using a generic type of catalytic converter protection. As such, the instant invention represents a significant improvement over the prior art.

A novel system for deterring catalytic converter theft includes one or more devices designed to be installed on the underside of a vehicle in order to prevent easy access to a catalytic converter, whether by preventing a potential thief from easily accessing the catalytic converter itself, or by preventing a potential thief from easy access to points where the catalytic converter and exhaust system are attached to the vehicle, or can be cut free from the vehicle. In addition, the system may prevent a potential thief from easily removing the catalytic converter from the vehicle. Indeed, the system prevents easy access to the catalytic converter, presenting such a level of impracticality to a thief, that a potential thief moves on and does not take the time and effort which removing the catalytic converter would take.

In one embodiment the disclosed device attaches to the underside of a vehicle and covers the catalytic converter, which is often exposed to easy access by a potential thief. The device may take the form of a plate which attaches to the underside framing of the vehicle and covers the catalytic converter. In some embodiments, the catalytic converter will also be surrounded by other vehicle components, preventing easy access to the catalytic converter from other locations and allowing a simple plate to prevent all easy access. In other embodiments, the vehicle may have no other components close to the catalytic converter, or there may be few attachment points for a device, necessitating a device which encloses the catalytic converter from more than just below, perhaps including side plates or a complete box. In other embodiments, there may be locations where the exhaust system of the vehicle can be easily detached at locations far removed from the catalytic converter, requiring additional covers to protect areas of void in the underside of the vehicle which grant access to the catalytic converter through longer tools or simply unbolting portions of the exhaust system.

Figure 11:
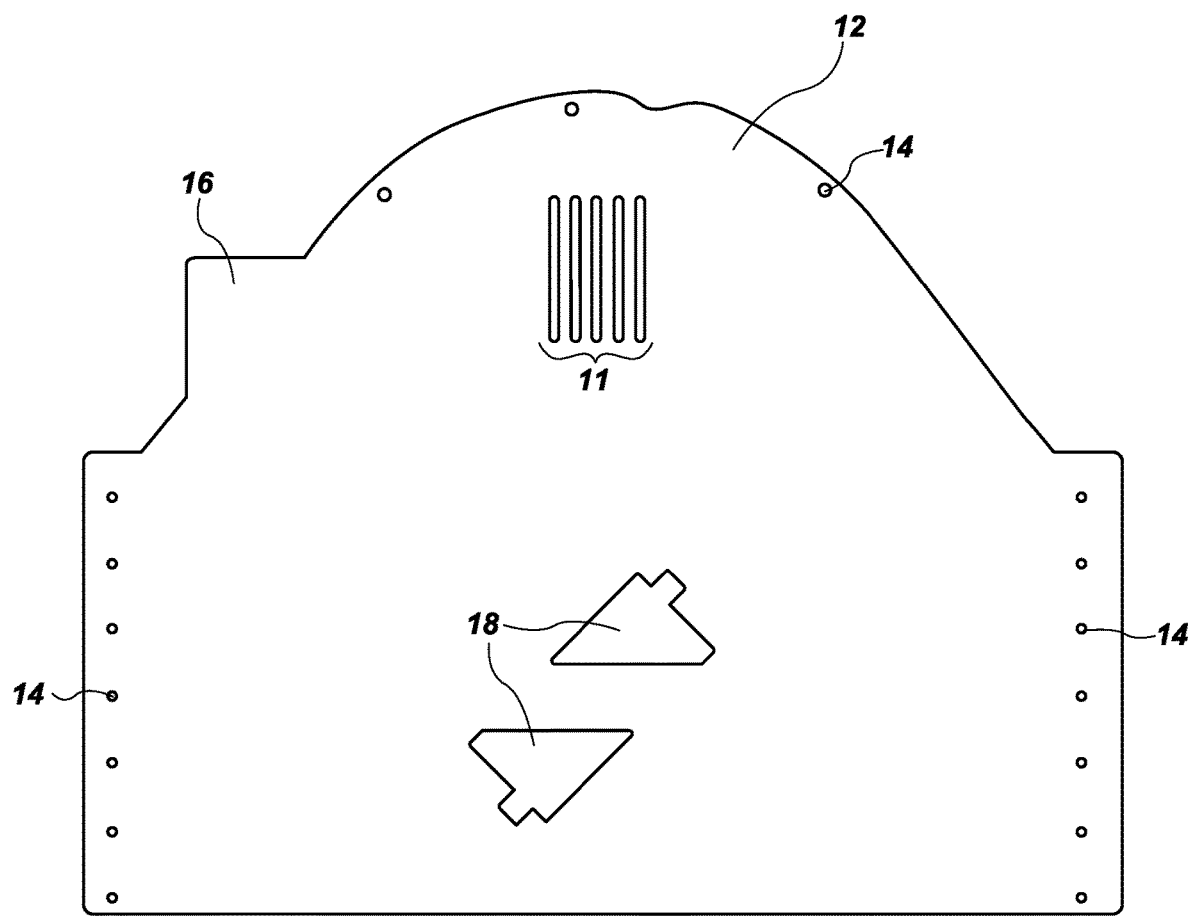
FIG. 11 shows one embodiment of a system for deterring catalytic converter theft being a plate designed to fit over the catalytic converter of a vehicle.

FIG. 11 shows one embodiment of the instant disclosure which is a planar, plate-like structure, which is designed to specifically fit over catalytic converter and the portions of the exhaust system of the vehicle which are exposed. In this embodiment, the device prevents easy removal of the catalytic converter. The embodiment shown in FIG. 11 is designed to deter theft of a catalytic converter from a 2004-2009 Toyota Prius. In one embodiment, the device may include an additional structure, such as a dog-ear corner 16 which covers the oxygen sensor of the vehicle, thus preventing theft of the oxygen sensor as well.

FIG. 11, additionally, shows one embodiment the device comprises a window cutout 18 placed in the device at a strategic location to allow for viewing the catalytic converter's associated manufacturing information such as serial number or part number. In many states of the United States, emissions authorities require that associated manufacturing information on the surface of the catalytic converter be accessible for an inspection. This window may be a simple rectangular window or it may take the shape of a particular design which is desired by the manufacturer.

Still referring to FIG. 11, in one embodiment the theft deterrence device is cut from an aluminum plate. In addition to being light and resisting corrosion, when cut with a radial saw or other saw-like cutting tool aluminum tends to form small particles which fill in the gaps between the teeth of the cutting tool, slowing progress and making it more difficult to cut through. While the preferred embodiment is cut from an aluminum plate, it will be understood that simply by being present the plate will slow the progress of a potential thief, and any material which will significantly slow the process of accessing and removing the catalytic converter will serve a similar function and this disclosure is not intended to limit the potential materials out of which the device can be constructed. For example, stainless steel could be used to construct a plate or theft-deterrence system which would be effective.

Figure 12:
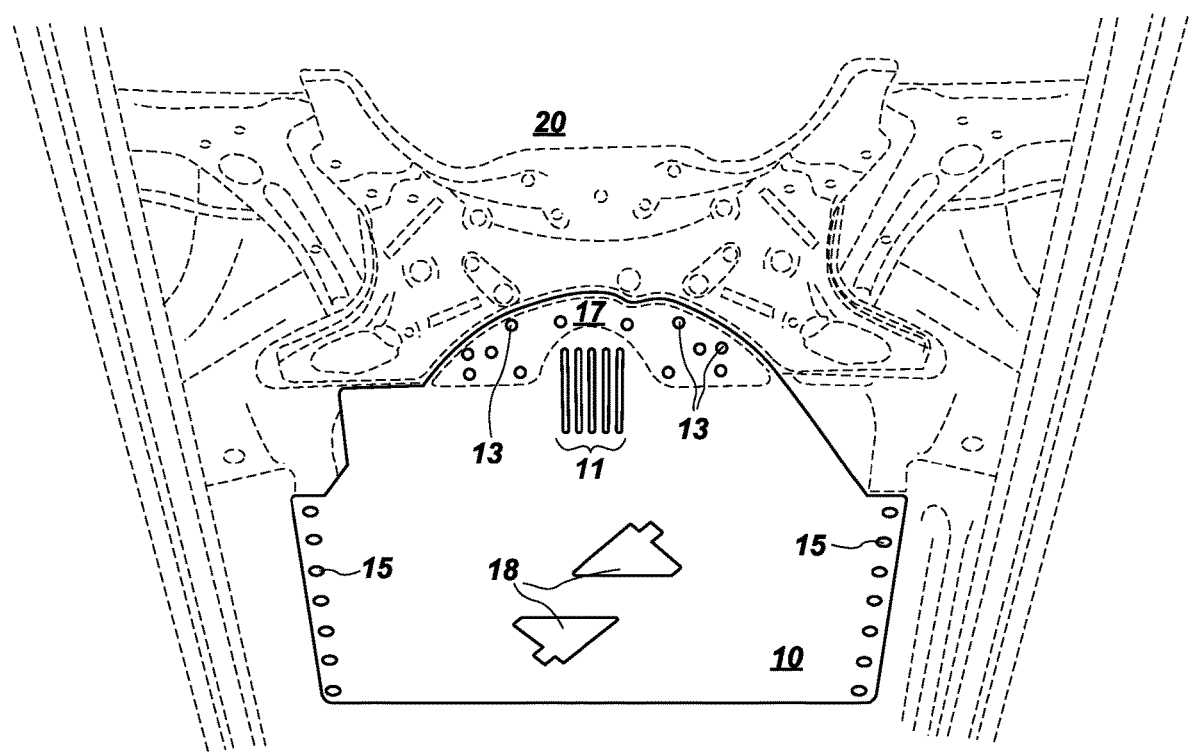
FIG. 12 shows one embodiment of a system for deterring catalytic converter theft as installed on the underside of a vehicle over the catalytic converter.

In one embodiment, still referring to FIG. 11, the theft deterrence device also comprises a number of through-holes 14 around the perimeter 12 of the device. These through-holes are used for attaching the device to the underside of the vehicle. As shown in FIG. 12, wherein the components on the underside of the vehicle are shown with dotted lines and the device is shown in solid lines, the device 10 is installed on the bottom of the vehicle 20 by attaching it to the frame of the vehicle. In one embodiment, the front through-holes 13 are mounted on existing factory studs (also at 13) where an OEM splash guard 17 is mounted after removing the splash guard and replacing it over the device. In one embodiment, the device is further secured to the bottom of the vehicle by attaching it at the side attachment points 15 to the frame rails 24 on the bottom of the vehicle around the catalytic converter. In one embodiment the cover 10 is secured to the frame rails 24 using a combination of rivets and security fasteners. In one embodiment, eight rivets are used along with six security screws (four rivets and three security screws on each side). In one embodiment the through-holes are only drilled as the device is attached to the vehicle.

In one embodiment, a device for deterring catalytic converter theft also includes a vent 11 which allows for the circulation of air around the catalytic converter and the exhaust system of the vehicle. This maintains proper cooling of the exhaust system and helps to prevent overheating.

Figure 13A:
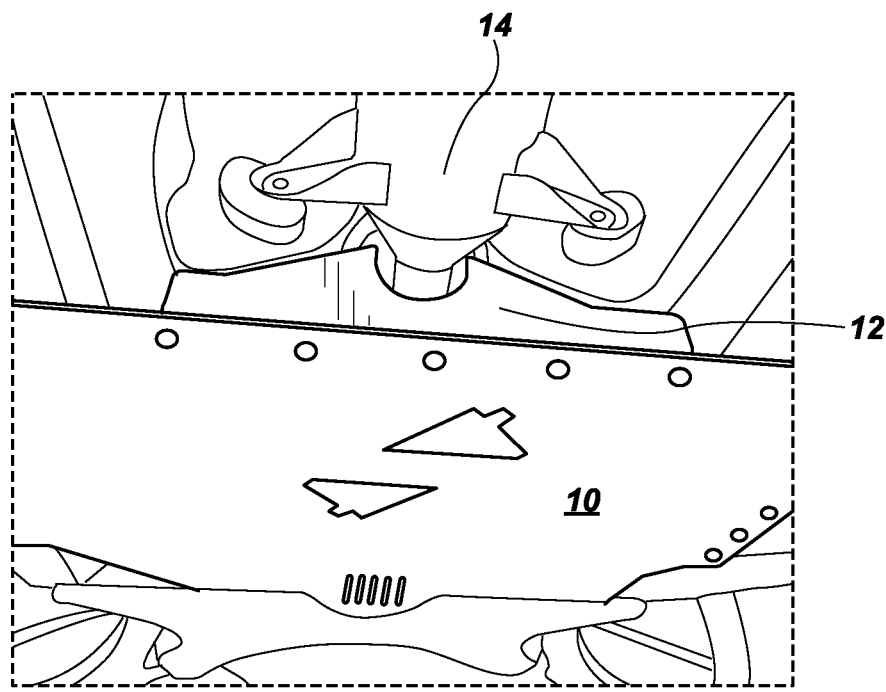
FIG. 13A shows another embodiment of a system for deterring catalytic converter theft, showing a rear rail which is installed to further prevent access to the catalytic converter and deter theft.
Figure 13B:
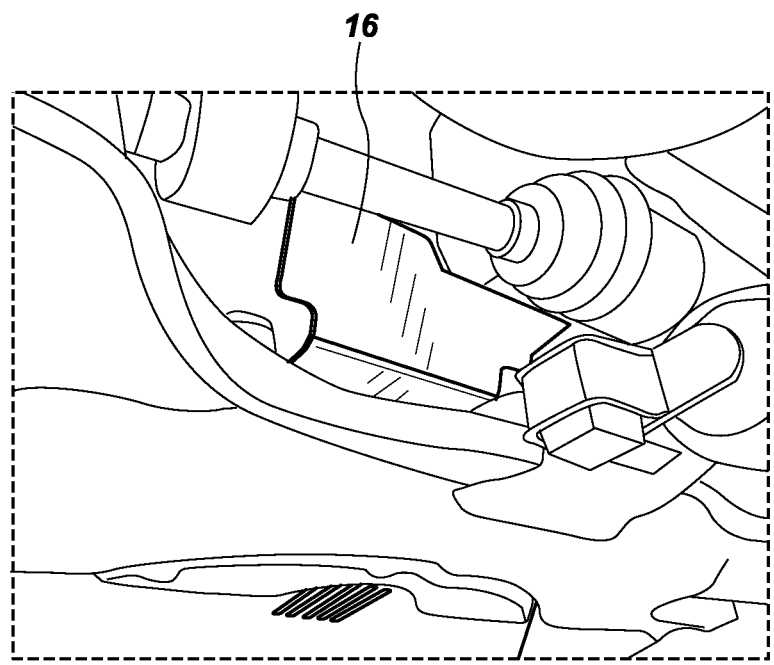
FIG. 13B shows a plate in one embodiment of a system for deterring catalytic converter theft which is installed in a front void to prevent easy access to the catalytic converter.

In another embodiment of a system to deter catalytic converter theft shown in FIGS. 13A-B, additional plates or security rails may be installed along with the plate shown in FIG. 11 to prevent a potential thief from accessing the catalytic converter through other areas under the vehicle. FIG. 13A shows a first (rear) security rail 12 placed in back of the plate 10 shown in FIG. 11. The security rail extends perpendicularly from the plate and has a space for the exhaust pipe 14 to pass through the rail. The rear security rail prevents access to the space between the cover 10 and the bottom of the vehicle, further deterring catalytic converter theft.

FIG. 13B shows a front security plate 16 installed in a void in the front of the vehicle which prevents access to the exhaust system and hence the catalytic converter through that void. In one embodiment, the security rails and additional security plates further restrict access to the exhaust system and catalytic converter by covering and protecting areas from which the catalytic converter and exhaust system may be indirectly accessed. In one embodiment, these plates and rails are specifically designed to cover the vulnerable locations in a specific vehicle. The embodiments shown in FIG. 13 show embodiments designed for a Toyota Prius 2004-2009 model year. However, additional embodiments are possible for other vehicles but must be specifically designed for those vehicles for optimal protection. In some cases the plate itself may be sufficient to deter theft, as access to the catalytic converter with the plate installed is much more difficult than without the plate installed, but additional plates or security rails may increases the difficulty of accessing the catalytic converter and thus further deter theft of said catalytic converter.

Figure 14A:
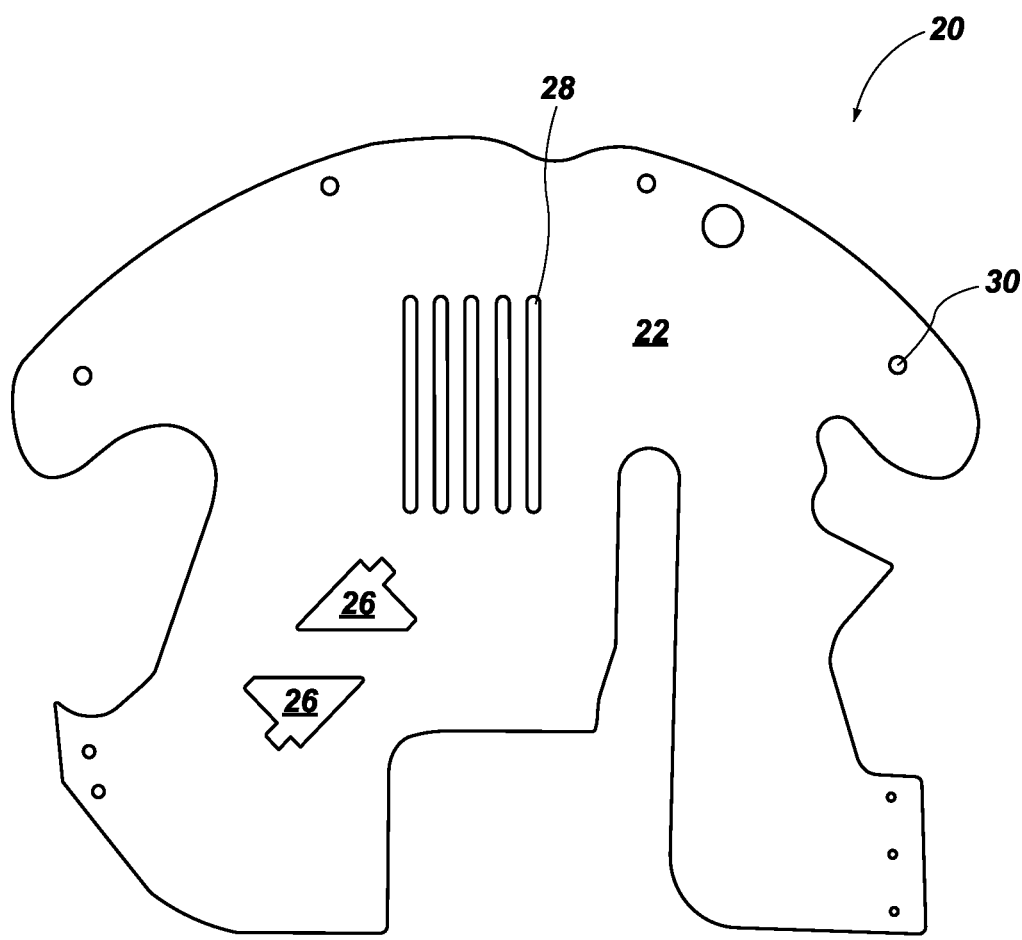
FIG. 14A shows one part of another embodiment of a system for deterring catalytic converter theft, being a plate which fits over the catalytic converter.
Figure 14B:
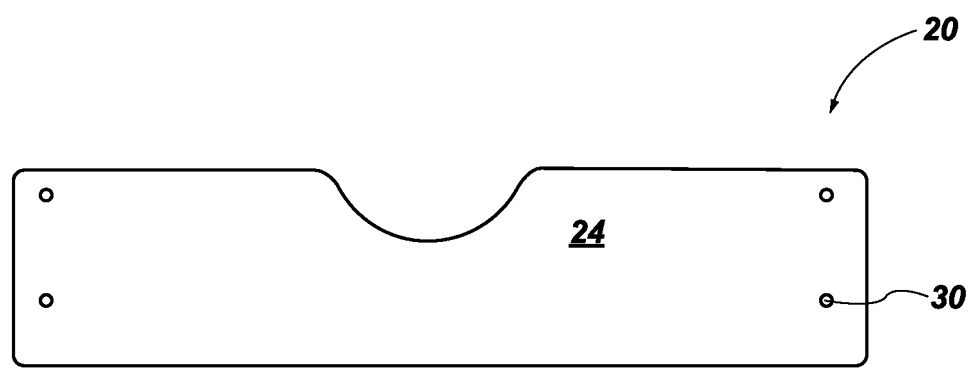
FIG. 14B shows a second part of one embodiment of a system for deterring catalytic converter theft, being a plate which fits over the heat extractor behind the catalytic converter, helping deter catalytic converter theft.

Another embodiment of a system to deter catalytic converter theft, shown in FIGS. 14A-B, is designed to apply to a 2010-2015 Toyota Prius vehicle. In one embodiment the theft deterrent device must be shaped differently in order to properly fit on the bottom of the vehicle and cover up the catalytic converter to deter theft. This embodiment comprises a front plate 22, shown in FIG. 14A, and a rear plate 24, shown in FIG. 14B. In this embodiment the front and rear plate together prevent access to the catalytic converter while also deterring a thief from removing the heat extractor behind the catalytic converter. In one embodiment there is a window 26 to allow easy viewing of the catalytic converter manufacturing information. Furthermore, vents 28 are provided which allow air to flow around the catalytic converter area, facilitating cooling of the converter and the exhaust system. In this embodiment the device attaches to points on the vehicle underbody. Again, in one embodiment of a method for deterring catalytic converter theft the devices are attached to the vehicle using a combination of rivets and security fasteners secured through holes 30 located around the perimeter 20 of the device. These rivets and security fasteners prevent the device from being easily removed and better deter catalytic converter theft. In one embodiment the security fasteners are security screws which require a special tool to fasten and remove.

In one embodiment of a method of deterring catalytic converter theft, the location of the catalytic converter is assessed on the underside of the vehicle, along with the position of points at which easy access to the exhaust system can be gained. A metallic plate is then cut out to cover the catalytic converter and easily attach to the frame or body of the underside of the vehicle. In some embodiments covering the access points to the catalytic converter and exhaust system may require additional plates or coverings. In one embodiment each of these coverings may have vents cut into it to allow for air circulation. In another embodiment, the plate which covers the catalytic converter itself has a window cut into it to allow viewing of the data on the catalytic converter without removal of the plate. In one embodiment of the device, it may be attached to the vehicle with a combination of rivets and security fasteners, preventing the plate from being quickly removed by a potential thief and further deterring catalytic converter theft.

It will be understood that different vehicles may require differently-shaped devices or different combinations of devices to properly deter catalytic converter theft. Devices with different shapes are anticipated and expected by this disclosure, which is not meant to limit the shape of the device being used to prevent catalytic converter theft. Even for the specific models of vehicle disclosed herein, variations in size and shape of the device may be possible.

In another illustrative embodiment of the present disclosure, a device is designed to deter theft of a catalytic converter located in a position where it cannot be shielded by a simple plate. When a catalytic converter is surrounded by other components of the vehicle, a simple plate can protect the converter and the rest of the exhaust system, preventing it from being cut away and preventing the catalytic converter from being removed.

Figure 1B:
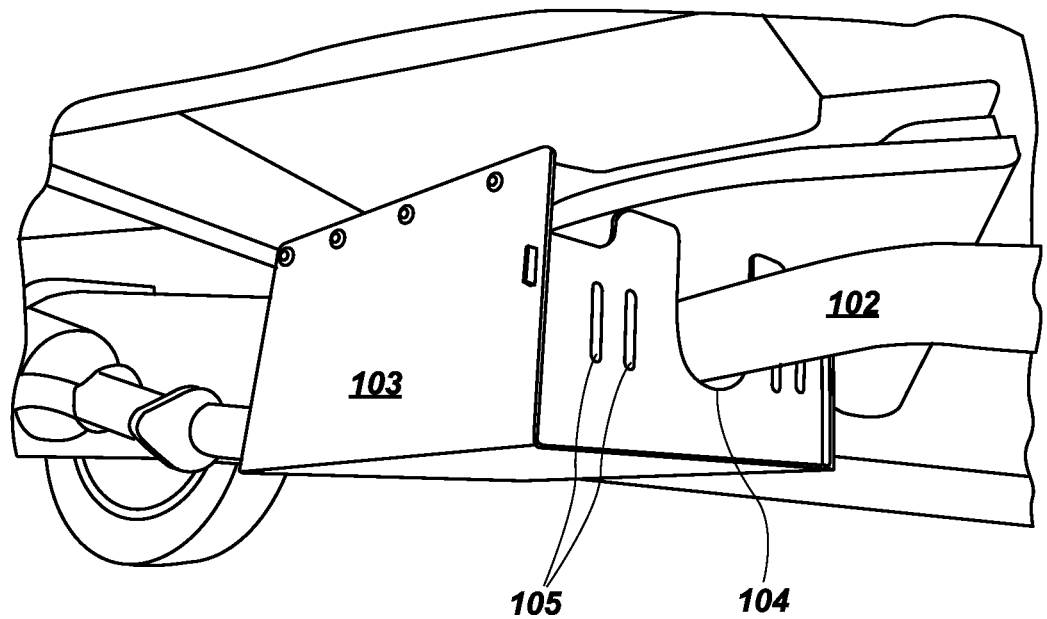
FIG. 1B shows the same catalytic converter in FIG. 1a protected by one embodiment of the present disclosure.

However, in some cases, the catalytic converter is located in a position where a simple plate cannot deter theft of the catalytic converter. This may be because the catalytic converter is easily accessed or is simply located on the bottom of the vehicle. One example of a catalytic converter located in such a position is shown in FIG. 1A, which shows a catalytic converter 101 connected to an exhaust pipe 102, which is exposed on all sides and is easily accessible to potential thieves. FIG. 1B shows the same catalytic converter protected by one embodiment of the present disclosure 103.

FIG. 1B shows one illustrative embodiment of the present disclosure, being a box 103 which is bolted to the vehicle as described below. The box prevents the catalytic converter from being easily removed from the vehicle. Even if the catalytic converter is detached from the exhaust system of the vehicle, it cannot be removed from the box 103, which is securely attached to the frame of the vehicle. The box 103, has openings 104 through which the exhaust pipe 102 passes through, and in one embodiment may have vents 105 to promote proper air circulation and cooling. As such, the illustrated embodiment is designed to deter theft by hindering a thief from being able to remove the catalytic converter and carry it away from the vehicle.

Another illustrative embodiment of the present disclosure involves a method of installing said box using security hardware, to prevent the easy removal of the box. In one illustrative embodiment of the present disclosure the box is constructed out of stainless steel to prevent the box from being cut into or easily cut off of the vehicle. The box greatly increases the time which a thief must spend in attempting to remove the catalytic converter, thus deterring the theft of the catalytic converter, as it both decreases the likelihood that a thief will attempt to steal the catalytic converter of a particular vehicle and increases the likelihood that someone will notice, as the time to get at the catalytic converter is greatly increased.

In another illustrative embodiment of the present disclosure, the box is comprised of four distinct components. The first component of this embodiment is shown in FIGS. 2A-D. The first component is the top portion of the box and comprises a piece of sheet metal which can be attached to the vehicle. In one illustrative embodiment for the Nissan NV-200 van, a bracket may be attached to the frame of the vehicle as shown in FIG. 1B, to which the first component is attached. The first component is attached to the vehicle in a way which makes it difficult to remove. For example, the first component, and the bracket it is attached to, may be securely attached using rivets, security fasteners, or whatever other type of connecting device which prevents the easy removal of the bracket and top portion of the device from the vehicle.

Figure 2B:
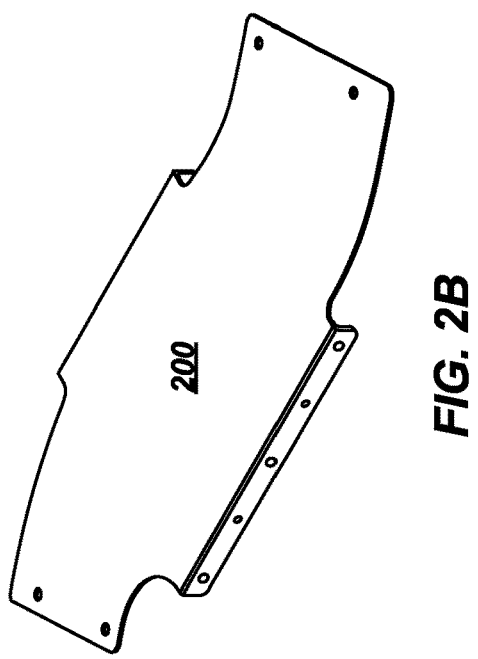
FIG. 2B shows an orthogonal view of the same component in FIG. 2A
Figure 2D:
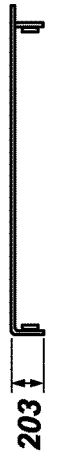
FIG. 2D shows another side view of the top component in FIG. 2A, showing the height of the lip.
Figure 2A:
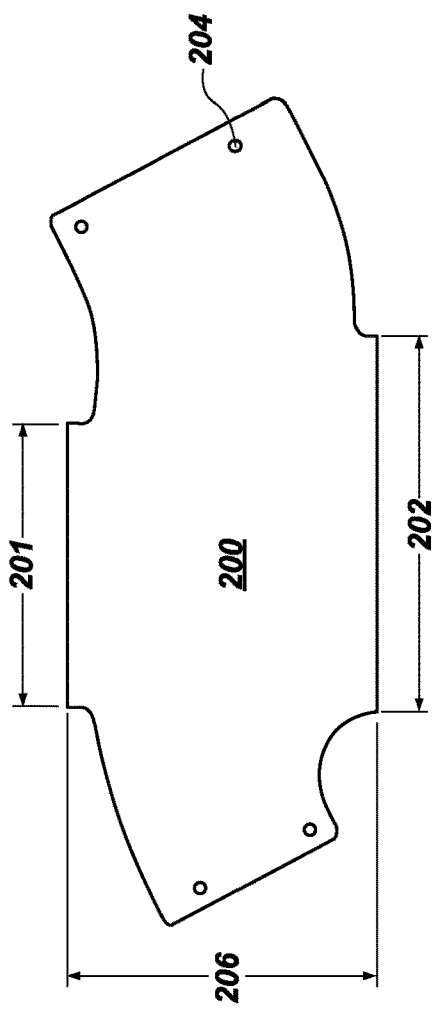
FIG. 2A shows a top down view of the top component of one embodiment of the present disclosure, being the top portion of a box secured around the catalytic converter and attached to the underside of the vehicle.
Figure 2C:
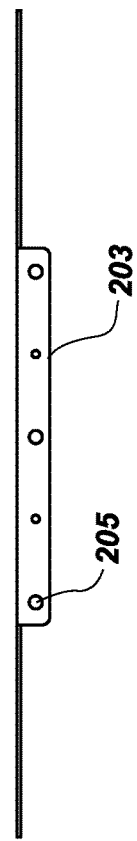
FIG. 2C shows a side view of the top component shown in FIG. 2A, showing a lip with attachment points to attach the top component to the other components of one embodiment of the present disclosure.

FIG. 2A shows a top down view of the first component which is attached to the underside of the vehicle. In one embodiment the first component may be 9 inches along a first side 201 and 12 inches along a second side 202, while the distance between the first and second side along a third side 206 may be 9.86 inches but many other dimensions may be used in accordance with the vehicle the present disclosure is applied to. These measurements may be adopted for the best fit depending on the vehicle. Both sides 201, 202 may have a perpendicular lip 203 seen in FIGS. 2C and 2D, which is designed to be attached to the other components of this embodiment. This lip 203 may be one inch wide. In another embodiment, a lesser or greater width may be used in order for the side to be an appropriate width to install proper connecting hardware to connect the first component 200 to the second component 300. FIG. 2B shows an orthogonal view of the first component, while FIG. 2C shows a side view from the direction of the second side 202.

FIG. 2D shows a side view looking from the direction of the third side 206. This component has through holes 204 on the top edges which are used to attach the first component to the vehicle with rivets, security fasteners, or another type of connecting device that prevents easy removal. It also has through holes 205 on the perpendicular lip 203 which are used to secure the first component 200 to the second component 300.

The first component 200 is designed to be attached to the second component of the box 300, shown in FIG. 3, which comprises the sides and bottom of the box. It will be appreciated that again, this connection may be accomplished with whatever secure method of connecting may be known in the art. For example, security fasteners may be used to make it more difficult to remove the box and catalytic converter. The first component is attached to the vehicle in a location above the catalytic converter, allowing the second component to be attached in such a way as to surround the catalytic converter.

Figure 3C:
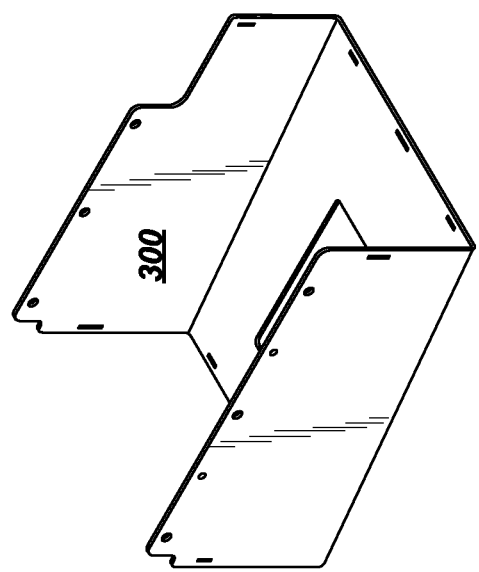
FIG. 3C shows the second component shown in FIG. 3A as constructed.
Figure 3D:
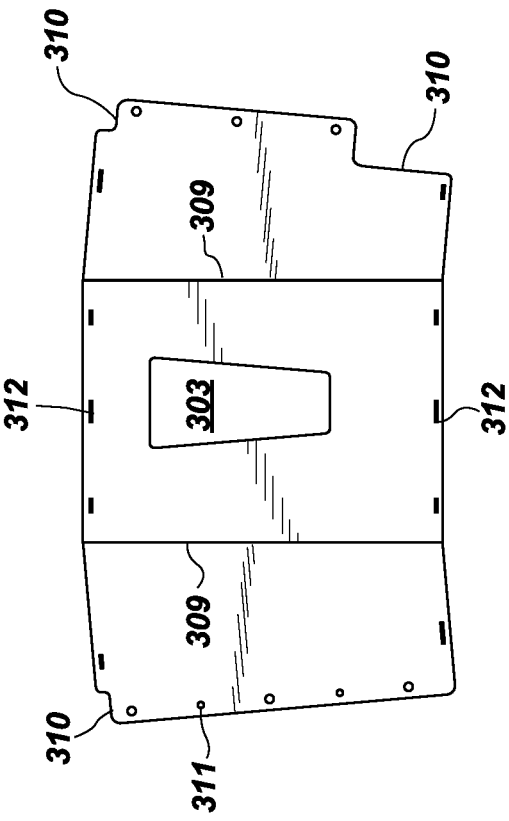
FIG. 3D shows the second component shown in FIG. 3A before construction, being cut our of single metal plate and showing the lines on which the plate is folded to construct the component as seen in FIG. 3C.
Figure 3A:
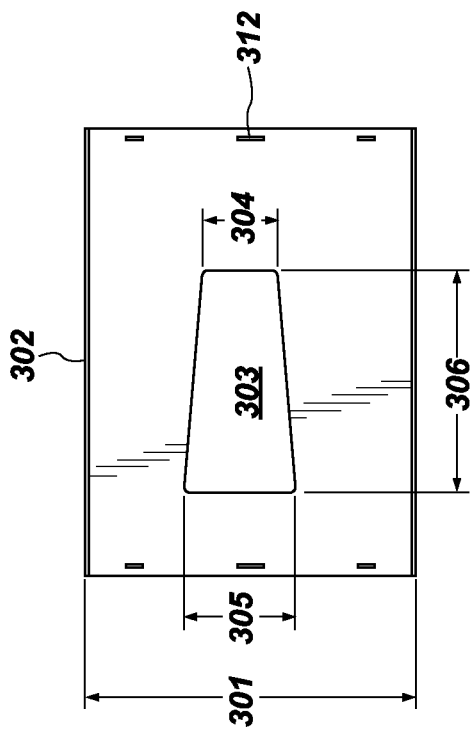
FIG. 3A shows a bottom view of the second component of one embodiment of the present disclosure, being two sides and the bottom of a box secured around the catalytic converter and attached to the underside of the vehicle, showing a window in the bottom of the box for viewing the catalytic converter.

The second component of the box comprises two sides of the box and the bottom of the box, as shown in FIGS. 3A-D. FIG. 3A shows the bottom of the second component, which may be 10 inches along a first side 301 and 13.5 inches along a second side 302. The second component may have a window in it 303 located in the center of the bottom side which is 2.3 inches along a first side 304 and broadens to approximately 3.4 inches along a second side 305. The window may be approximately 6.7 inches in length 306.

Figure 3B:
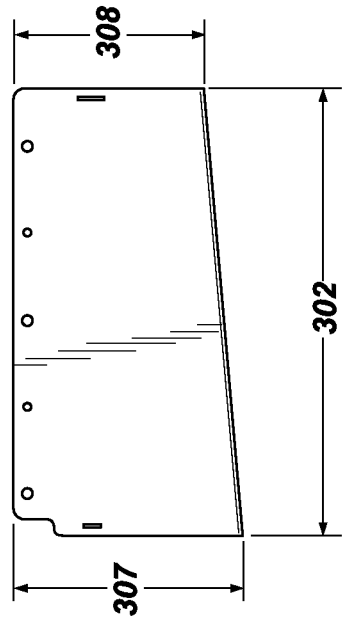
FIG. 3B shows a side view of the second component shown in FIG. 3A, showing the slope of the box and fastening points.

FIG. 3B shows a side view of the second component, showing the second side 302. It also shows that the second component is taller along a first end 307 with a height of approximately seven inches, while having a height of approximately five and three-quarters inches along a second end 308. FIG. 3C shows a three-dimensional view of the second component 300. FIG. 3D shows the second component as it is cut, showing lines 309 where the sides are folded up ninety degrees from the bottom to produce the box shown in FIG. 3C. The notches 310 are cut out to provide an optimal fit. There are also through-holes 311 which are used to connect the second component 300 to the first component 200. It should also be noted that the exemplary slots 312 along the first 306 and second 307 ends are designed to accept tabs from the two side components to create a finished box.

The size of the second component is whatever size will efficiently cover the catalytic converter without interfering with the functioning of the vehicle, while the size of the window is designed to allow viewing of the catalytic converter and the information on it, while not allowing the catalytic converter to fit through the window. The window may be covered with a grating which still allows easy visual access to the information on the catalytic converter. The sizes stated here may be modified according to these principles. The top edges of the two sides are designed to attach securely to the first component of the box, while the empty sides are designed to have the third and fourth components of the box fitted in to create a complete box around the catalytic converter. The second component of the box will have a window cut out of the bottom portion of the box which is too small for the catalytic converter to fit through, but allows for technicians to view the catalytic converter and the information present on it and verify information and legality of the catalytic converter. Examples of information which may be present on the catalytic converter are OEM factory markings, or aftermarket part numbers or California Executive Order numbers or other information which is used to verify that the catalytic converter is legal for use on a specific vehicle. As noted above, the second component of the box may be attached to the first component of the box through any secure means which will secure it to the vehicle and prevent the easy removal of the box. In general, this may include security fasteners, rivets, or other secure hardware.

Figure 5:
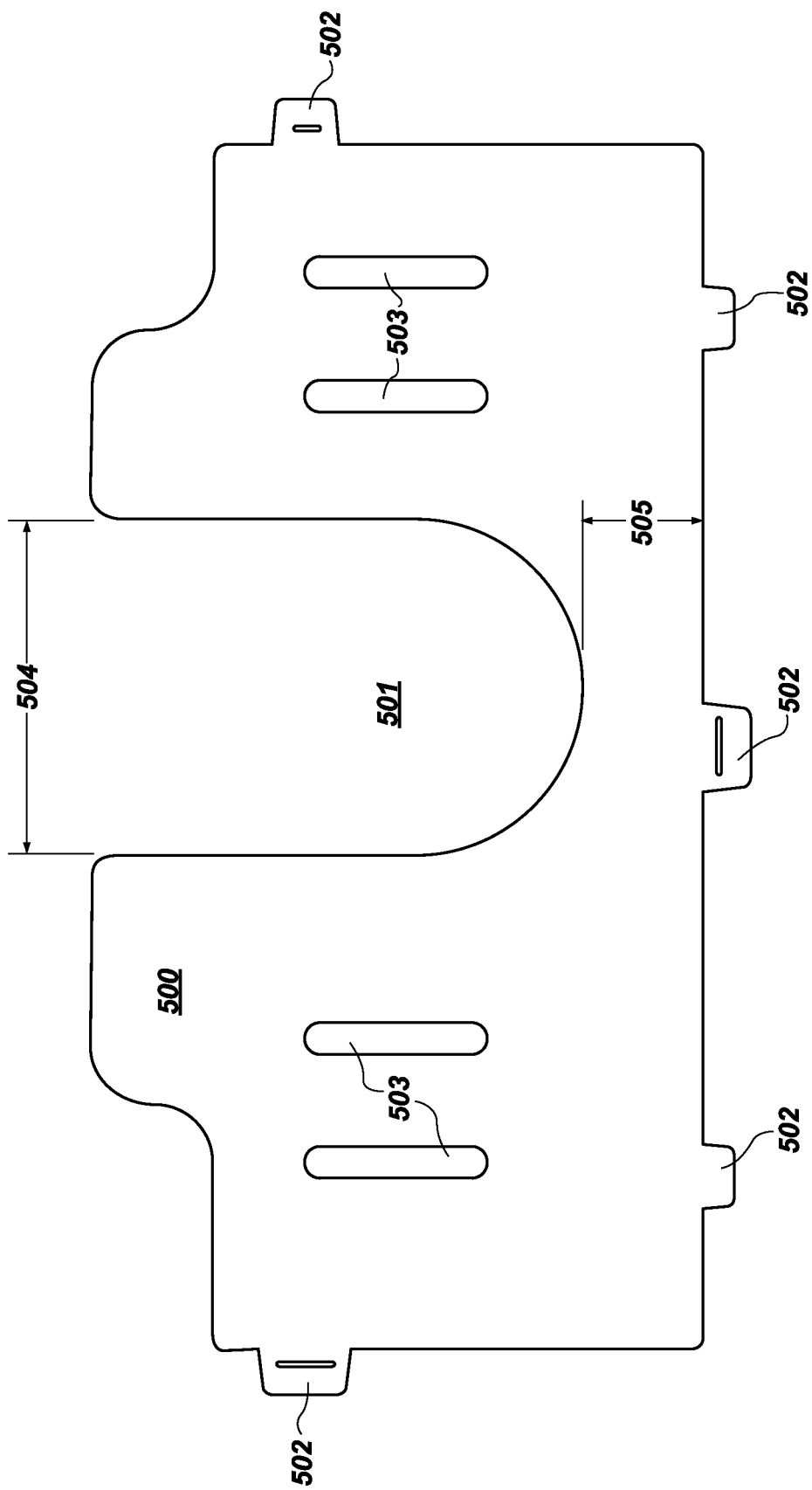
FIG. 5 shows the fourth component of one embodiment of the present disclosure, being the rear shield of the box secured around the catalytic converter and attached to the underside of the vehicle.

The third and fourth components of the box, shown in FIGS. 4-5 are end caps. The third component 400, shown in FIG. 4, is attached to the front of the second component. The third component 400 may have a height 406 of approximately 5.875 inches including the tabs 402 on the bottom, and is designed to fit snugly on the front side of the second component 300 of the box when it is fitted to the first component of the box 200. The third component has a gap 401 which is designed to fit around the exhaust pipe when installed, but is also small enough to prevent the catalytic converter from being removed from the box. This gap is designed so that it fits around the exhaust system without actually touching it, giving the system proper clearance. In one embodiment this gap has a length 404 of three and a quarter inches wide with a 0.375 inch distance 405 between it and the bottom side of the third component. The gap may begin a distance 407 of approximately 3.125 inches from one side of the third component. It will be appreciated that such dimensions are merely exemplary and many other dimensions can be used in accordance with the present disclosure.

Still referring to FIG. 4, the third component 400 also has tabs 402 on the sides which are designed to fit into the slots on the second component of the box, securing the two components together. The tabs 402 may be bent over once the two components are fitted together to help secure the components together. In addition, the third component may have vents 403 which allow for airflow around the exhaust system.

FIG. 5 shows the fourth component of the box 500. This component is similar to the third component 400, and is of similar size, but is designed to fit on the rear portion of the second component 300. The fourth component 500 also has a gap 501, but the gap may have a width 504 of only two and three quarter inches, and may be a distance 505 of a full inch from the bottom of the component. The fourth component 500 also has tabs 502 to secure it to the second component 300 in the same manner as the third component 400. In addition, the fourth component may have vents 503 which are cut out to allow for the proper circulation of air.

It will be appreciated that the box formed of these components does not prevent a thief from attempting to cut through the exhaust system of the vehicle to remove the catalytic converter. However, it does make simply cutting through the exhaust system fruitless, as the catalytic converter remains inside the box, which is securely attached to the vehicle and cannot be easily removed. Therefore the box deters catalytic converter theft by preventing the catalytic converter from being taken in any amount of time acceptable to a thief.

It will also be appreciated that the embodiment of the box as shown is one illustrative embodiment of the present disclosure, which is designed to precisely protect the rear catalytic converter of a Nissan NV-200 cargo van. However, a similar box could be used to protect the catalytic converter of any vehicle with an exposed converter with few other vehicle components around it. It will also be appreciated that other similar or partial configurations are possible which fit specifically with catalytic converters located in similar positions on other vehicles.

Figure 6A:
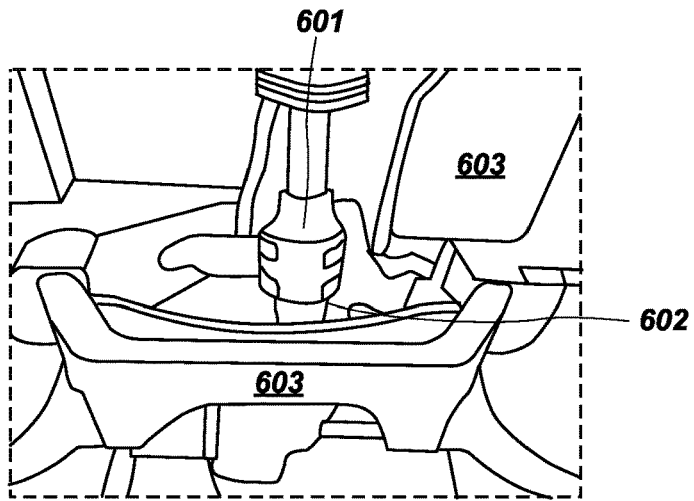
FIG. 6A shows the middle void in a vehicle which allow access to the front exhaust flange where a catalytic converter can be easily unbolted from the vehicle, showing the catalytic converter.
Figure 6B:
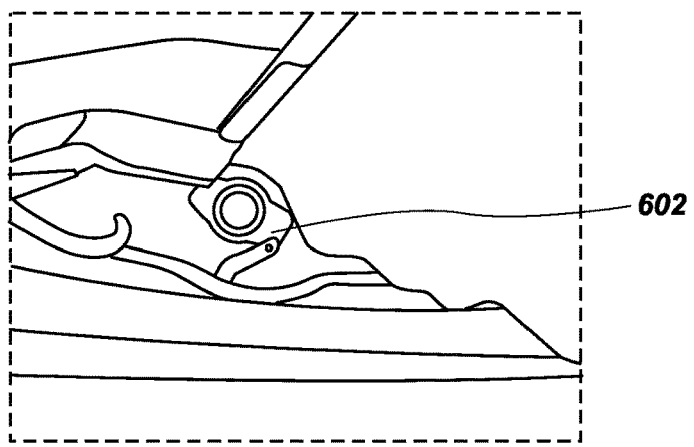
FIG. 6B shows the middle void in a vehicle which allow access to the front exhaust flange where a catalytic converter can be easily unbolted from the vehicle, with the catalytic converter removed.
Figure 6C:
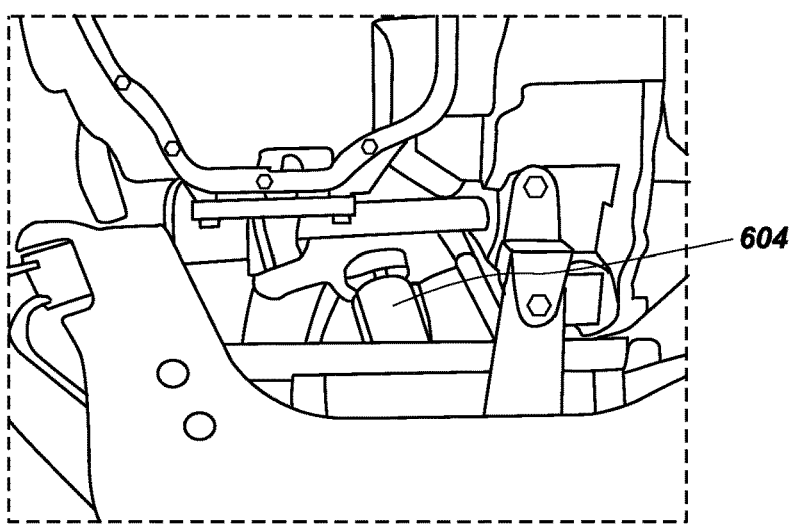
FIG. 6C shows the front void in a vehicle which allow access to the front exhaust flange where a catalytic converter can be easily unbolted from the vehicle.

It will be appreciated that other embodiments may be necessary to protect catalytic converters in other locations on the vehicle. For example, the front catalytic converter of a Nissan NV-200 is located in a part of the vehicle where it is difficult to surround with a box, and which is not easily covered with a plate due to other components. Furthermore, the front portion of the connection is easily un-bolted from the vehicle, allowing the catalytic converter to be removed easily. FIG. 6A shows this catalytic converter 601 and the void around it 602, while also showing the vehicle components 603 which make it difficult to install a box or flat plate around this catalytic converter. FIG. 6B shows the void 602 without the catalytic converter. FIG. 6C shows a void 604 at the front of the vehicle where the exhaust system can be easily accessed to remove the front catalytic converter of the Nissan NV-200. This void 602 and the front void 604 allow easy access to the front exhaust flange. The catalytic converter 601 can be easily un-bolted from the vehicle at the front exhaust flange. One illustrative embodiment of the present disclosure requires covering the voids where a thief can gain access to the catalytic converter and exhaust system with metal plates which are themselves another embodiment of the present disclosure.

Figure 7A:
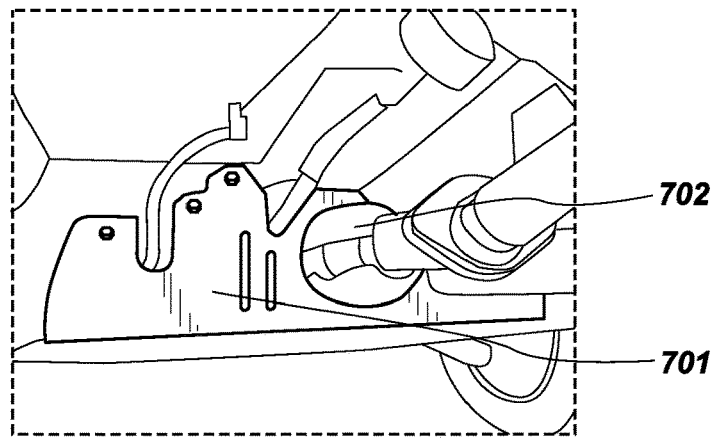
FIG. 7A show the middle void in FIG. 6A covered by an embodiment of the present disclosure which prevents easy access to the front exhaust flange and deters catalytic converter theft.
Figure 7B:
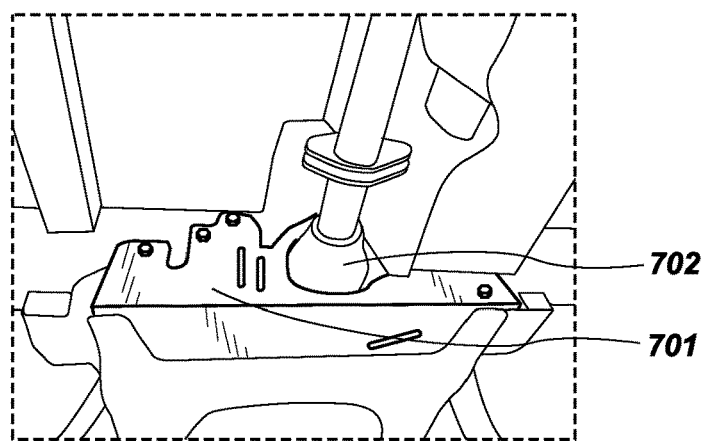
FIG. 7B shows the middle void in FIG. 6A from a lower angle, covered by an embodiment of the present disclosure which prevents easy access to the front exhaust flange and partially covers the catalytic converter, deterring Catalytic Converter theft.

FIGS. 7A-7B show the middle void covered by a metal plate 701, which is another embodiment of the present disclosure, from two different angles: FIG. 7A looking straight at the plate and FIG. 7B looking at the plate from a lower angle. This plate 701 makes access to the catalytic converter 702 difficult, preventing access to the front flange where a catalytic converter can be unbolted from the middle of the vehicle, while still allowing for an inspector or technician to see the parts of the converter that need to be seen for inspection. The plate 701 may be formed of aluminum or another, appropriately strong, material which will prevent easy cutting and removal of the plate or catalytic converter, such as stainless steel.

Figure 8C:
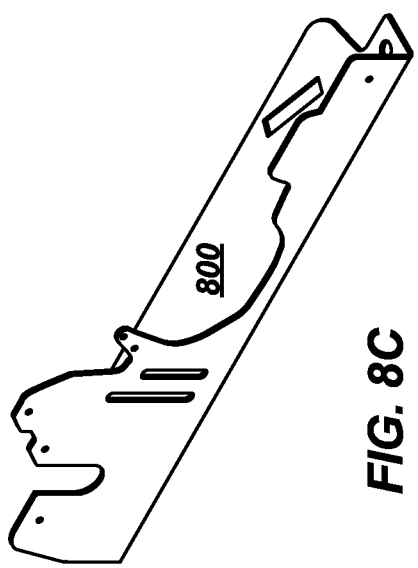
FIG. 8C shows a top diagonal view of the plate designed to cover the middle void and deter catalytic converter theft in one embodiment of the disclosure.
Figure 8D:
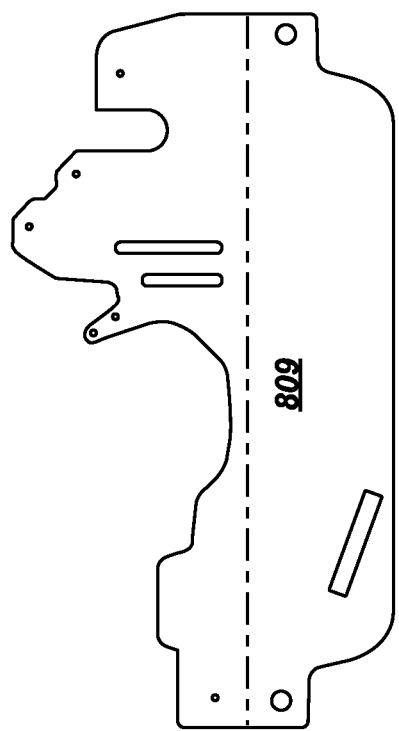
FIG. 8D shows a diagram of the plate designed to cover the middle void and deter catalytic converter theft in one embodiment of the disclosure as it is cut out, showing the line on which the plate is folded to form the finished plate shown in FIG. 8C.
Figure 8A:
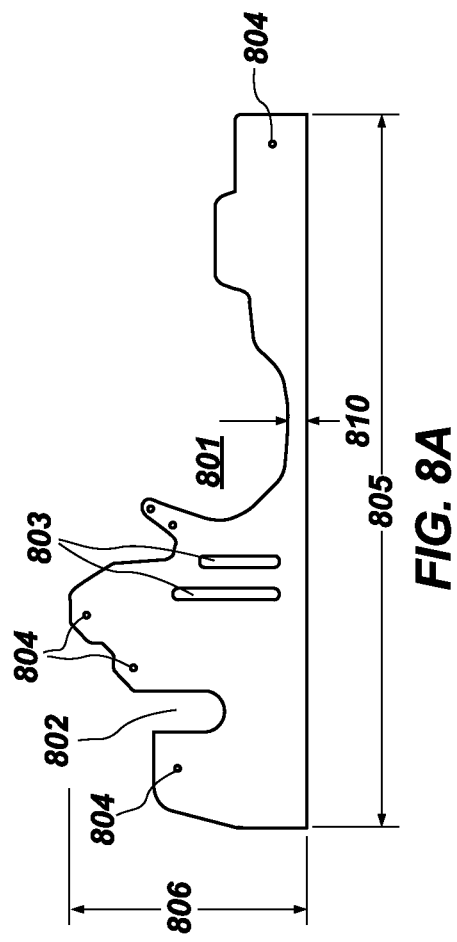
FIG. 8A shows a side view diagram of the plate designed to cover the middle void and deter catalytic converter theft in one embodiment of the disclosure.
Figure 8B:
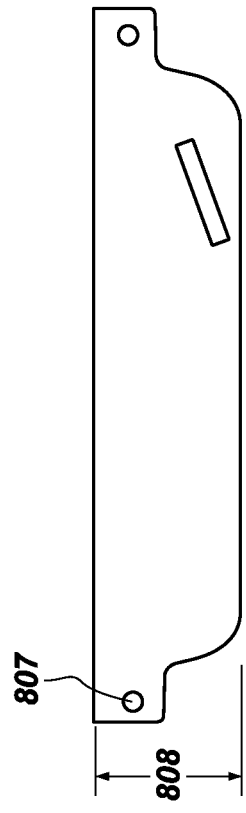
FIG. 8B shows a bottom view diagram of the plate designed to cover the middle void and deter catalytic converter theft in one embodiment of the disclosure.
Figure 9A:
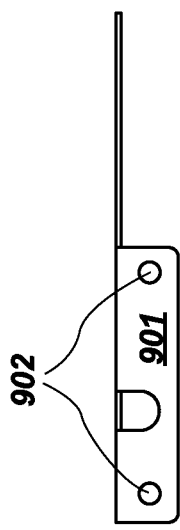
FIG. 9A shows a side view diagram of the plate designed to cover the front void and deter catalytic converter theft in one embodiment of the disclosure, showing the lip used to attach the plate to the vehicle.
Figure 9B:
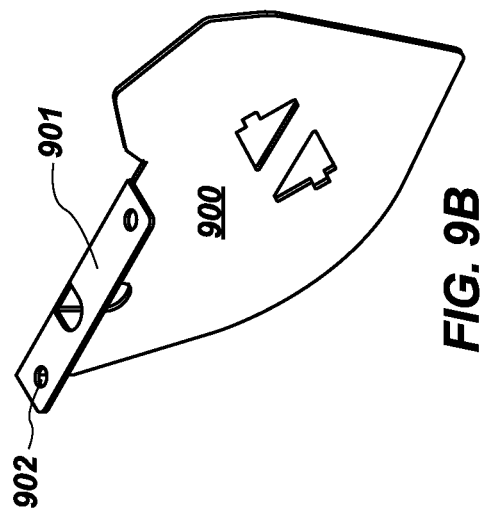
FIG. 9B shows a top diagonal side view diagram of the plate designed to cover the front void and deter catalytic converter theft in one embodiment of the disclosure.
Figure 9C:
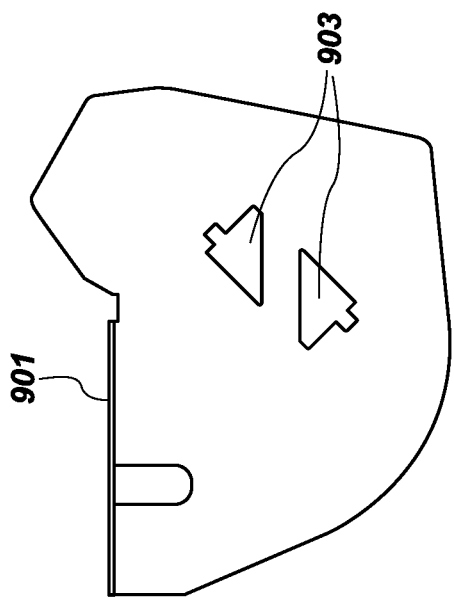
FIG. 9C shows a top down view diagram of the plate designed to cover the front void and deter catalytic converter theft in one embodiment of the disclosure.
Figure 9D:
FIG. 9D shows a side view diagram of the plate designed to cover the front void and deter catalytic converter theft in one embodiment of the disclosure.
Figure 9E:
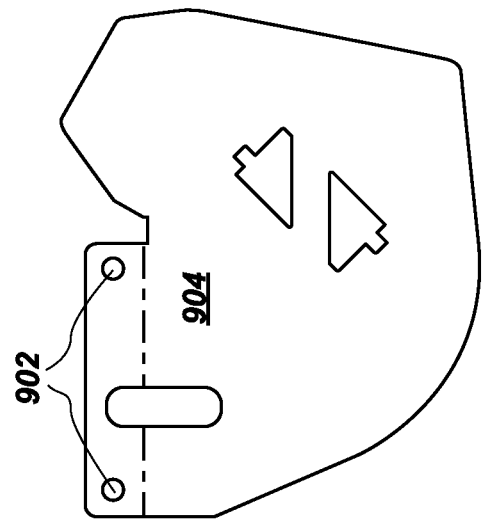
FIG. 9E shows a top down view diagram of the plate designed to cover the front void and deter catalytic converter theft in one embodiment of the disclosure as it is cut out, showing the line on which the plate is folded to form the lip which attaches to the vehicle.

FIGS. 8A-8D show the configuration of a plate which fills the void as shown in FIGS. 7A and 7B, showing that the plate is cut to fit around the catalytic converter and the other cords and components of the vehicle in close proximity to it. FIG. 8A shows a side view of the plate, showing the semi-circular cut-out 801 which fits around the catalytic converter. This cut-out may extend to a distance 810 of 0.69 inches from the bottom of the plate. Other cut-outs 802 are designed to fit around the other components of the vehicle near the catalytic converter. Vents 803 are also present, and exemplary fastening points 804, where the plate may be secured to the vehicle. In one embodiment, designed for a Nissan NV-200 cargo van, the plate may have a length 805 of approximately 26.75 inches and a height at its greatest point 806 of approximately 8.875 inches. FIG. 8B shows the bottom of the plate, showing two large through-holes 807 which can be used to secure the plate to the vehicle. In one embodiment of the plate, the bottom has a width 808 of 5.5 inches. It will be appreciated that other dimensions may be readily used in accordance with the principles taught herein and to best apply to a particular vehicle.

FIG. 8D shows the arrangement of the plate as cut out, showing the line 809, on which the plate is bent to form the finished component 800 shown in FIG. 8C. The line 809 may be located as need to produce the finished form with the distances expressed in the previous figures.

Figure 7C:
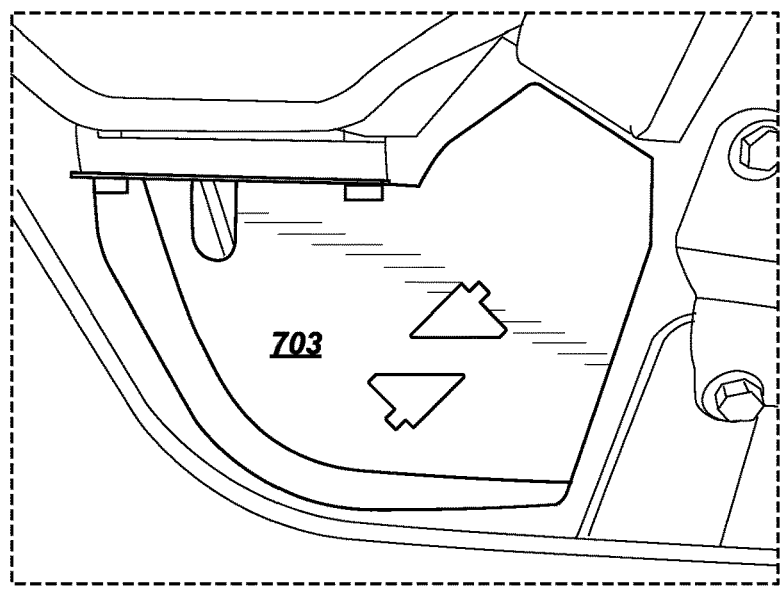
FIG. 7C shows the front void shown in FIG. 6C covered by an embodiment of the present disclosure which prevents easy access to the front exhaust flange and deters catalytic converter theft.

FIG. 6C shows the front void 604, where in a Nissan NV-200 a thief may also gain access to the front exhaust flange to unbolt the catalytic converter, FIG. 7C shows the void 604 covered by the front plate 703, which is fitted around a front void in the components of the engine and prevents easy access to the front exhaust flange, thus preventing the catalytic converter from being unbolted easily.

FIG. 9 shows a diagram of one embodiment of the front plate designed to fit around the front void of a Nissan NV-200, as seen in FIG. 6C. The plate as installed is shown in FIG. 7C. FIG. 9B shows an orthogonal view of the plate 900, showing a lip 901 designed to allow the plate to be secured to the vehicle. FIG. 9A shows the lip with two through holes 902 through which the plate may be installed on the vehicle. FIG. 9C shows a top down view of the plate, showing a vent 903 which may be present in one embodiment of the invention. FIG. 9D shows the plate from the side, showing the lip 901 used to install the plate, while FIG. 9E shows the plate as cut out, showing the line 904 which is folded at a ninety degree angle to create the lip 901. The front plate 900 is installed in the vehicle as shown and described in FIG. 7C. The through holes 902 are used to attach the shield to two factory bolts so that it can prevents access to the void shown in FIG. 6C.

FIGS. 9A-9D show a diagram of the front plate designed to fit the Nissan NV-200, but again it will be appreciated that a similar plate could be constructed to deny access to the front exhaust flange and prevent the catalytic converter from being removed from any vehicle, by modifying the part to fit the particular vehicle. The embodiment shown in FIGS. 7A-C, 8A-D & 9A-E is designed to fit a particular vehicle, the Nissan NV-200, but it will be appreciated that similar principles may be applied to other vehicles to deny access to the voids where a catalytic converter may be removed easily from the exhaust system of a vehicle.

The device shown in FIGS. 8A-D blocks access to the front exhaust flange from the middle of the vehicle. The device shown in FIGS. 9A-E prevents access to the front exhaust flange from the front of the vehicle. The combination of the two plates prevents the catalytic converter from being easily unbolted from the vehicle at the front exhaust flange. It will be appreciated that in some illustrative embodiments, depending on the vehicle and the location of the catalytic converter and the other components on the underside of the car, one, or both of the devices will be used to prevent the catalytic converter from being removed. In one embodiment, used on the Nissan NV-200, both components are used to prevent the front catalytic converter from being removed. It will also be appreciated that in some cases, such as where the catalytic converter is completely exposed, an embodiment as shown in FIGS. 1A-B, 2A-D. 3A-D & 4 will be the more effective way to deter catalytic converter theft. In one embodiment, particularly used to deter catalytic converter theft on the Nissan NV-200, but which can be adapted for use in similar vehicles with two catalytic converters, a system is used to deter catalytic converter theft which comprises a box as shown in FIGS. 1A-B, 2A-D. 3A-D & 4 positioned around the rear catalytic converter while the plates shown in FIGS. 7A-C, 8A-D & 9A-E are placed to deter theft of the front catalytic converter.

Figure 10:
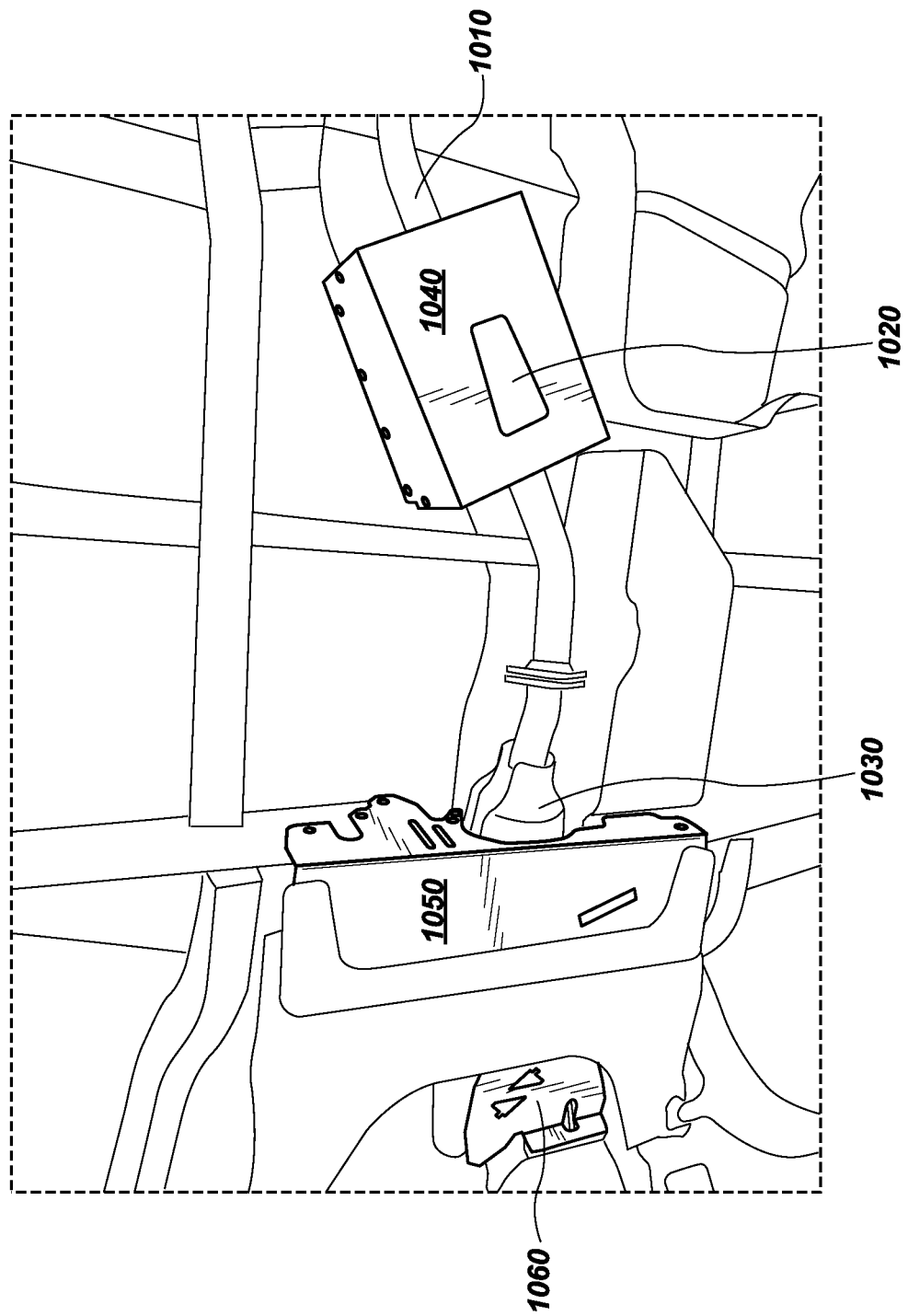
FIG. 10 shows one embodiment of the present disclosure using the box shown in FIGS. 1-5 to protect a rear catalytic converter while using the plates shown in FIGS. 7-9 to protect a front catalytic converter and deter theft of catalytic converters from a Nissan NV-200 cargo van.

One embodiment of a system to deter catalytic converter theft, shown in FIG. 10, is installed on a Nissan NV 200. FIG. 10 shows the underside of the vehicle, including the exhaust pipe 1010 and the catalytic converters 1020 and 1030, only portions of which are visible due to the installed system. The system comprises the box 1040 formed of the components shown and described in FIGS. 1A-B, 2A-D. 3A-D & 4 and assembled as described to deter theft of the rear catalytic converter 1020. Also shown are the mid-shield plate 1050 described in FIGS. 8A-D and the front shield 1060 described in FIGS. 9A-E, which are installed as described to protect the front catalytic converter 1030. As a whole, the system is designed to deter theft of either catalytic converter by preventing a potential thief from easily accessing the catalytic converters and the areas of the vehicle where the catalytic converters can be easily removed from the vehicle. As such, in order to remove a catalytic converter, a would-be thief would have to devote far more time than removing the catalytic converter from an unprotected vehicle, causing a thief to either give up and move on or perhaps be caught in the additional time required.

The embodiments described may be constructed out of an appropriate metal, such as stainless steel, more specifically out of stainless steel plating, which is cut into the shapes required and fitted to the vehicle. Such plating can be 14 gauge, 16 gauge or another suitable thickness as will be know to those filled in the art. It will be noted, though, that this disclosure is not meant to be limiting on the thickness of the plating used, as thicker or thinner materials may work as well or may be required with different vehicles. Furthermore, while stainless steel plating may be desirable for specific embodiments, in other embodiments, aluminum may be the preferred material in some applications. Furthermore, while metals are preferred, other materials such as a high-temperature plastic or polymer may be adapted for the purpose. This disclosure is not meant to be limiting on the thickness or type of materials.

In another illustrative embodiment of the present disclosure, a method of deterring catalytic converter theft is proposed. Said method involves preventing easy access to the voids on the underside of the vehicle where easy access to the catalytic converter and the components attaching the catalytic converter to the vehicle are located. In one illustrative embodiment, these components may be portions of the exhaust system which are easily cut through. In another illustrative embodiment they may be portions of the exhaust system where the catalytic converter can be easily unbolted, such as the front exhaust flange.

Another illustrative embodiment of the present disclosure involves installing a device which prevents the catalytic converter from being removed from the vehicle even if it is detached from the rest of the exhaust system. This deters theft because a thief will realize that even if the catalytic converter can be easily detached from the exhaust system, the thief will likely not realize any benefits as the catalytic converter can not easily be taken. In this embodiment, the system should be designed such that it is clear to the thief that they will not be able to access the catalytic converter. Hence installing a box which is securely bolted to the car around the catalytic converter. This will hopefully deter the thief before the thief cuts into the exhaust system and damages the vehicle.

In another illustrative embodiment of the present disclosure, shown in FIGS. 9A-E, the system is designed to protect the catalytic converters of a Nissan NV-200. In this embodiment, there are three distinct areas of protection. The first area of protection for the Nissan NV-200 is a void at the front of the vehicle where the front catalytic converter is bolted at the front exhaust flange. The first area of protection is covered by a plate shaped and designed to deny access to front void.

The second area of protection is the mid-section void. The system protects this void through a formed plate that attaches to a crossmember, then folds up to block easy access to the voids and surround the catalytic converter. This prevents a common tool from being used to unbolt the front flange and remove the catalytic converter from the mid-section void. Therefore, the first two areas of protection prevent the front catalytic converter from being removed from the vehicle by preventing it from being unbolted from the front flange. While a thief could still attempt to cut behind the front catalytic converter, a thief cannot access any portion of the front connection of the catalytic converter to the vehicle, thus preventing easy removal of the catalytic converter.

The second catalytic converter of the Nissan NV-200, located under the main body of the vehicle, is protected by the box shown in FIGS. 1A-B, 2A-D. 3A-D & 4. This catalytic converter is very easily accessible to thieves. To deter theft of the second catalytic converter, a bracket is attached to the existing frame rails on the underside of the vehicle, to which a stainless steel box is attached to surround the catalytic converter. This stainless steel box as shown is attached using security fasteners and is attached to the bracket and the underside of the vehicle. The front and end caps go around the exhaust tubing, while the main box comprises the bottom three sides of the box and surrounds the catalytic converter. The top component of the box is a bracket which attaches to the frame on which the box is mounted. The main box also comprises a viewing window which allows the catalytic converter to be viewed and authenticated in an inspection. The rear protective device prevents the catalytic converter from being removed from the vehicle. Therefore, even if the converter is severed from the rest of the exhaust line, it is still contained in the box and cannot be removed without removing the security fasteners and the box itself. Desirably, as represented in FIG. 10, the present disclosure provides three distinct areas of protection, which together provide advantages and benefits which are not otherwise available in the art.

One embodiment of a system for deterring theft of a catalytic converter while allowing visual inspection of the catalytic converter includes a cover installed on the underside of a vehicle around the catalytic converter which prevents access to the exposed catalytic converter and exhaust system from the underside of the vehicle. In one embodiment this cover also includes an opening to allow a technician to view the catalytic converter. This opening may be a grate or numerous small slits through which the catalytic converter can be viewed, or it may be a window which is small enough that the catalytic converter can not be removed through it, while being large enough to view the critical information for a smog check on the catalytic converter while also ensuring the legality of the catalytic converter. There may also be vents in the plate which allow for proper air circulation around the catalytic converter and the exhaust system and other components on the underside of the vehicle.

In one embodiment, the cover may be attached to the underside of the vehicle by drilling a series of holes through the frame on the underside of the vehicle and attaching the device to the underside of the vehicle through the use of rivets. In another embodiment security fasteners may be used, and a combination of rivets and security screws may be used to secure the cover to the frame on the underside of the vehicle. In other embodiments, a system for deterring theft of a catalytic converter may be installed directly to the underside of a vehicle. In yet another embodiment, a cover may be secured to existing factory bolts which are a part of the vehicle. These bolts may be used as installed, or additional, longer bolts may be installed in place of the factory bolts in the places where the factory bolts are generally installed.

In another embodiment, a system for deterring catalytic converter theft may also comprise one or more additional plates, in addition to the main cover which prevents direct access to the catalytic converter. These additional plates may be placed to prevent access to one or more voids where the catalytic converter or exhaust system of the vehicle may be accessed and detached from the vehicle in order to remove the catalytic converter from the vehicle. These additional plates may be secured to using the existing bolts in the vehicle (which may be replaced with security fasteners) or they may be secured by screws and/or rivets to the frame of the vehicle.

One embodiment of the device described herein is easy on a vehicle and once installed, covers the catalytic converter and attached exhaust pipe so that a thief is denied access to the converter. The only viable choice for a determined thief encountering the device on the vehicle is to engage in a lengthy disassembly of the device from the underbody of the vehicle, which would be time consuming and impractical. The device achieves its goal of deterrence by presenting such a level of impracticality to a thief, that a savvy thief will move on to other, less protected vehicles.

In one embodiment, the invention is comprised of a plate which is cut to span between the various vehicle underpinnings and attach to them. For example, framed vehicles, such as pickup trucks, have frame rails and cross members; the device would be cut to span between frame rails and attach to them. The device can also be cut to strategically attach to the underpinnings of vehicles employing unibody construction. Regardless of the underpinnings to which the device is attached, the device spans over and covers the area beneath the vehicle, which contains the catalytic converter, adjacent exhaust pipe front, and rear of the converter and oxygen sensor. The final result is a plate covering the catalytic converter and adjacent components, totally denying access to a thief.

In another embodiment the present disclosure comprises a series of plates to cover a variety of voids in the underside of the vehicle which allow access to the catalytic converter. In yet another embodiment the present disclosure comprises a box created to bolt onto the vehicle which prevents a thief from removing the catalytic converter from the vehicle. In addition, two or more of the above embodiments may be combined to provide the best protection for a catalytic converter in a particular vehicle.

The components of the present disclosure may be constructed out of whatever material is easily shaped and withstands the conditions under the vehicle while being difficult to cut through and deter theft. In a preferred embodiment the components are formed out of metal, and in one embodiment out of stainless steel. In another embodiment the components are formed out of aluminum. However, other metals may be used which are not so heavy as to adversely affect the functioning of the vehicle. It is possible that other materials, such as a solid, high temperature plastic or other polymer could be adapted to use in the present disclosure.

While in some cases embodiments have been described for a particular vehicle, it will be appreciated that said embodiments may be adapted to fit vehicles with similar placement of the catalytic converter so as to effectively deter theft of the catalytic converter and prevent damage to the vehicle. As such, one or more embodiments may be used for a particular vehicle depending on the arrangement of vehicle components surrounding the catalytic converter and the ease of access to the catalytic converter.

It will also be understood that different vehicles may require differently-shaped devices or different combinations of devices to properly deter catalytic converter theft. Devices with different shapes are anticipated and expected by this disclosure, which is not meant to limit the shape of the device being used to prevent catalytic converter theft. Even for the specific models of vehicle disclosed herein, variations in size, shape, dimensions and composition of the device is possible in accordance with the principles set forth herein.

Although the present disclosure has been illustrated and described herein with reference to preferred illustrative embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A system for deterring theft of a catalytic converter located in a vehicle, the system comprising:
  a box designed to fit around the catalytic converter, the box attaching to the vehicle;
  said box comprising openings for exhaust system components connecting to the catalytic converter;
  wherein said box also comprises an opening to allow a human to view the catalytic converter; and,
  wherein said box is securely fastened to the vehicle such that the box cannot easily be removed in a short amount of time;
  wherein the box comprises four separate components, wherein the components are:
    a top which is securely attached to the vehicle;
    a main box which comprises a bottom and two sides, which securely fastens to a top, comprising slots on ends for end caps to fit into;
    two end caps, which comprise plates having tabs that fit into the slots of the main box;
    the box being securely fastened tightly together, such that no one of the components is easily removable from the other components, and such that the box is not easily removable from the vehicle, and wherein the catalytic converter is not easily removable from the box.

2. The system of claim 1 wherein the vehicle includes a frame and wherein a bracket is attached securely to the vehicle frame and the box is fastened securely to the vehicle by means of the bracket secured to the vehicle frame.

3. The system of claim 1 wherein the box is comprised of stainless steel plates.

4. The system of claim 1 also comprising:
  a cover installed on an underside of the vehicle around a second catalytic converter, preventing easy access to at least part of the second catalytic converter and the exhaust system from the underside of the vehicle;
  wherein said cover also allows a human to view the second catalytic converter.

5. The system of claim 4 wherein the cover installed on the underside of the vehicle covers a void in a midsection of the vehicle around the second catalytic converter, preventing easy access to a front exhaust flange from the midsection of the vehicle in addition to preventing direct access to the catalytic converter.

6. The system of claim 5 also comprising a front plate covering a void in a front of the vehicle and covering a location where the second catalytic converter is attached to the front exhaust flange, increasing the difficulty of unbolting the second catalytic converter at the front exhaust flange; and,
  wherein the cover and the front plate together prevent easy access to the front exhaust flange where the second catalytic converter is bolted to the vehicle and prevent easy physical access to an area in front of the second catalytic converter so the second catalytic converter cannot be removed at the front exhaust flange.

7. The system of claim 6 wherein the vehicle is a Nissan NV-200 cargo van and wherein the front plate is designed to attach to factory bolts in the vehicle and prevent easy access to the front exhaust flange from the front of the vehicle;
  wherein the cover is designed to attach to a factory crossmember and folds up to prevent easy access to the front catalytic converter and prevent easy access to the front exhaust flange from the midsection of the vehicle; and,
  wherein the cover installed on the underside of the vehicle around the second catalytic converter is designed to surround the second catalytic converter and is installed to the underside of the vehicle with security fasteners and attached to a bracket which is attached to two frame rails of the vehicle.

8. A method of deterring catalytic converter theft on a vehicle having a frame, the method still allowing visual access to the catalytic converter, said method comprising:
  attaching a first cover over the catalytic converter, wherein said first cover extends over the catalytic converter and a void which surrounds the catalytic converter by attaching to the vehicle frame;

wherein the first cover contains an opening which, when installed, is located directly over the catalytic converter to allow the visual access to the catalytic converter for inspection;

covering a front exhaust flange and a front void at a front of the vehicle with a second cover designed to impede access to the front exhaust flange from the front of the vehicle to impede the catalytic converter from being easily detached from the front exhaust flange.

9. The method of claim 8 wherein said first cover takes the form of a flat plate shaped to prevent physical access to the catalytic converter while fitting around other components on an underside of the vehicle and extending to points on the underside of the vehicle to which the plate can be fastened.

10. The method of claim 8 also comprising using security fasteners to attach the first cover and second cover to the vehicle.

11. The method of claim 8 wherein the second cover only partially blocks access to the catalytic converter while preventing easy access to the front exhaust flange where the catalytic converter is secured to the vehicle by preventing easy access to the front void which leads to said front exhaust flange.

12. The method of claim 8 wherein the first cover secured to the vehicle takes the form of a box.

13. The method of claim 12 wherein the box comprises four separate components, namely:
- a top which is securely attached to the vehicle;
- a main box which comprises a bottom and two sides, which securely fastens to the top, comprising slots on ends for end caps to fit into;
- two of the end caps, which comprise plates with tabs that fit into the slots of the main box;
- an entirety of the box being securely fastened tightly together such that no one of the components is easily removable from the other components, and such that the box is not easily removable from the vehicle, and wherein the catalytic converter is not easily removable from the box.

14. The method of claim 8 wherein the first cover and second cover are formed of stainless steel.

15. The method of claim 8 wherein the first cover and second cover are formed of aluminum.

16. The method of claim 8 also comprising:
securing a box around a second catalytic converter wherein the box is securely fastened to the vehicle, deterring theft by preventing the second catalytic converter from being easily taken after the second catalytic converter is removed from the exhaust system.

17. The method of claim 8 wherein the first cover also comprises vents to aid in air circulation around the catalytic converter.

18. The method of claim 8 also comprising securing the first cover to the vehicle at least in part by attaching the cover to existing hardware on an underside of the vehicle.

19. The method of claim 8 also comprising securing the first cover to the vehicle at least in part by replacing existing hardware on an underside of the vehicle with security fasteners which secure the cover to the vehicle and are fastened to the vehicle at locations where the existing hardware was fastened to the vehicle.

20. The method of claim 8 also comprising securing one or more additional covers to an underside of the vehicle, wherein said one or more additional covers are placed to prevent easy access to one or more voids where the catalytic converter or an exhaust system of the vehicle may be detached from the vehicle in order to remove the catalytic converter.

* * * * *